US012732773B2

(12) United States Patent
Landry et al.

(10) Patent No.: US 12,732,773 B2
(45) **Date of Patent: *Sep. 8, 2026**

(54) SYSTEMS, METHODS, AND MANUFACTURES FOR PROVIDING NETWORK SERVICES INCLUDING MOBILE SERVICES TO A LOCATION

(71) Applicant: John Mezzalingua Associates, LLC, Liverpool, NY (US)

(72) Inventors: Todd Edward Landry, Grayslake, IL (US); Massimo Notargiacomo, Castel Bolognese (IT); Roberto Orlandini, Budrio (IT); Giovanni Chiurco, Castenaso (IT)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,807

(22) Filed: Nov. 21, 2023

(65) Prior Publication Data

US 2024/0089696 A1 Mar. 14, 2024

Related U.S. Application Data

(62) Division of application No. 17/231,411, filed on Apr. 15, 2021, now Pat. No. 11,849,367, which is a (Continued)

(51) Int. Cl.

*H04W 4/02* (2018.01)
*H04L 25/00* (2006.01)

(Continued)

(52) U.S. Cl.

CPC ............... *H04W 4/02* (2013.01); *H04L 25/00* (2013.01); *H04W 4/029* (2018.02); *H04W 12/06* (2013.01);

(Continued)

(58) Field of Classification Search

CPC ....... H04W 4/02; H04W 4/029; H04W 12/06; H04W 72/044; H04W 4/024; H04W 88/085; H04L 25/00

See application file for complete search history.

(56) References Cited

U.S. PATENT DOCUMENTS 6,374,110 B1 4/2002 Parker et al.
8,396,445 B2 * 3/2013 Crawford ................ H04L 65/40 455/456.2

(Continued)

FOREIGN PATENT DOCUMENTS

CN 102780992 B 1/2015
EP 2635087 A1 9/2013
WO 2013/123494 A1 8/2013

OTHER PUBLICATIONS

Partial European Search Report dated Dec. 14, 2018, EP Application No. 16774147, pp. 1-12.

(Continued)

*Primary Examiner* — John J Lee

(74) *Attorney, Agent, or Firm* — MH2 Technology Law Group, LLP

(57) ABSTRACT

A method and a non-transitory computer readable medium having instructions stored thereon to cause one or more processors to perform a method are provided. Responsive to receiving a call to a predefined emergency number from a user device, an emergency state of the user device is forced. The forcing of the emergency state includes causing the user device to enable all radios in the user device, including any of cellular technology, Wi-Fi technology, and Bluetooth technology, to determine a location of the user device by use of remote radios and antennas at known locations in an RF distributions platform. First information associated with the user device is obtained, wherein the first information includes location information corresponding to the location (Continued)

of the user device. The first information is pushed to a public safety answering point.

19 Claims, 17 Drawing Sheets

Related U.S. Application Data division of application No. 16/382,315, filed on Apr. 12, 2019, now Pat. No. 11,012,805, which is a division of application No. 15/086,016, filed on Mar. 30, 2016, now Pat. No. 10,278,171.

(60) Provisional application No. 62/140,027, filed on Mar. 30, 2015.

(51) Int. Cl.

| | |
|---|---|
| ***H04W 4/029*** | (2018.01) |
| ***H04W 12/06*** | (2021.01) |
| ***H04W 72/044*** | (2023.01) |
| *H04W 4/024* | (2018.01) |
| *H04W 88/08* | (2009.01) |

(52) U.S. Cl.

CPC .......... *H04W 72/044* (2013.01); *H04W 4/024* (2018.02); *H04W 88/085* (2013.01)

(56) References Cited

U.S. PATENT DOCUMENTS

| | | | | |
|---|---|---|---|---|
| 2005/0064853 | A1 | 3/2005 | Radpour | |
| 2005/0064856 | A1 | 3/2005 | Radpour | |
| 2006/0258328 | A1* | 11/2006 | Godoy | H04W 4/90 455/433 |
| 2008/0069032 | A1 | 3/2008 | Liu | |
| 2008/0238614 | A1* | 10/2008 | Delia | G06F 21/88 340/5.85 |
| 2009/0149221 | A1 | 6/2009 | Liu | |
| 2009/0168695 | A1 | 7/2009 | Johar et al. | |
| 2012/0054405 | A1 | 3/2012 | Tolliver | |
| 2013/0229282 | A1 | 9/2013 | Brent | |
| 2013/0235801 | A1 | 9/2013 | Parsons et al. | |
| 2013/0243075 | A1 | 9/2013 | Dalela et al. | |
| 2014/0012935 | A1 | 1/2014 | Wu et al. | |
| 2014/0031049 | A1 | 1/2014 | Sundaresan et al. | |
| 2014/0094157 | A1 | 4/2014 | Nguyen et al. | |
| 2014/0248870 | A1 | 9/2014 | Grob et al. | |
| 2014/0376920 | A1 | 12/2014 | Laraqui et al. | |
| 2015/0023278 | A1 | 1/2015 | Boccardi et al. | |
| 2015/0143456 | A1 | 5/2015 | Raleigh et al. | |
| 2015/0215104 | A1 | 7/2015 | Ma | |
| 2018/0206100 | A1* | 7/2018 | Eisner | H04W 12/02 |

OTHER PUBLICATIONS

Blaine R. Copenheaver (Authorized Officer), International Search Report and Written Opinion dated Aug. 8, 2016, PCT Application No. PCT/US2016/025098, filed Mar. 30, 2016, pp. 1-14.

Author Unknown, European Office Action dated Dec. 12, 2018, EP Application No. 16162912.6, filed Apr. 5, 2017, pp. 1-8.

* cited by examiner

SYSTEMS, METHODS, AND MANUFACTURES FOR PROVIDING NETWORK SERVICES INCLUDING MOBILE SERVICES TO A LOCATION

CROSS-REFERENCE TO RELATED APPLICATIONS

This application is a continuation of U.S. application Ser. No. 17/231,411, filed Apr. 15, 2021, which is a divisional of U.S. Pat. No. 11,012,805, filed on Apr. 12, 2019 and issued on May 18, 2021, which is a divisional of U.S. Pat. No. 10,278,171, filed on Mar. 30, 2016 and issued on Apr. 30, 2019, which claims priority to Provisional Application No. 62/140,027 filed Mar. 30, 2015, the disclosures of which are incorporated by reference herein in their entirety.

BACKGROUND

Demands for end-user cellular mobile performance, also known as Mobile Broadband ("MBB"), are expected to increase by factors of 1000 over the next 5 years with MBB connections expected to reach nearly 6 billion by 2020. The forecast for these demands are concentrated on areas where there are high-densities of people, especially of an affluent enough nature that they are utilizing the latest in mobile devices (smartphones and similar user equipment). In addition to humans, an influx of embedded wireless radios within a wide array of machines and personal devices (cars, appliances, etc.) will further increase demands, this outgrowth is known as Internet of Things (IoT) or Machine to Machine (M2M) and is anticipated to 15 billion connected devices on the global networks by 2020. Bandwidth-consuming applications, including video communications and streaming of broadcast quality video, may push the demand for bits-per-second on a per user basis. As a result, the utilization of available, shared spectrum is critical—requiring a higher quantity of smaller-sized cells that can support larger quantities of users while delivering increases in each user's performance.

Small cell technology set out to address this growth. However, the nature of most small cells is such that they tend to have limitations in signal delivery, require many to cover an area, are limited in their ability to support an influx of active users, and create interference with each other, which reduces performance at many areas of cell edges resulting in users' devices being in a soft handover state often as user moves from one small cell coverage area to another—and often all of these transitions (handovers) require orchestration back to the core network, further complicating the solution. Add to this the fact that at each small cell requires backhaul considerations to each devices, typically demanding a dedicated network installed to assure capacity and security—a costly method to deliver. The results from all these factors is it has relegated small cells to be most suitable in very small office facilities.

Distributed antenna systems (DAS), in contrast, are exceptional at delivering balanced signal across medium and larger facilities. Unlike Small Cell technology, a DAS acts can either look like a single cell or smaller number of cells that do not require as many cellular-protocol handoffs when a user moves from one DAS antenna coverage area to another. Even when multiple cells are applied the ability to fine tune signal edges allows the RF design for a building to provide much better overall performance for users. They may combine radios with different power classes to optimize coverage, can be used to provide multiple-bearer paths to increase performance, and may carry multiple bands across multiple carriers to deliver multi-operator service within facilities. Conventionally, they are completely transparent to end users on the system and are dependent on traditional baseband processors (called BBUs or BaseBand Units) and their surrounding control infrastructure to "Roam" users from one cell to another. BBUs are the components that carry voice and/or data between a user's cellphone and the core cellular wireless network (e.g., ATT's network or Verizon's network). In some systems, the BBU may be a component of an eNodeB, which may also include a radio head. Conventional BBUs have no knowledge that they are on a DAS system, and thus they depend on the DAS to remain transparent, minimizing any extracurricular delays, and in many aspects maintaining its transparency. The conventional DAS and BBU function to provide capabilities, but they suffer drawbacks and deficiencies because they essentially ignore that each other exists.

SUMMARY

In a first aspect of implementations, a method for providing network services at a location is disclosed. According to the method, in response to receiving a call to a predefined emergency number from a user device, an emergency state of the user device is forced. The forcing of the emergency state includes causing the user device to enable all radios in the user device, including any of cellular technology, Wi-Fi technology, and Bluetooth technology, to determine a location of the user device by use of remote radios and antennas at known locations in an RF distributions platform. First information associated with the user device is obtained, wherein the first information includes location information corresponding to the location of the user device. The first information is then pushed to a public safety answering point.

In a second aspect of implementations, a non-transitory computer readable medium is provided that stores instructions that cause one or more processors to perform a method. According to the method, in response to receiving a call to a predefined emergency number from a user device, an emergency state of the user device is forced. The forcing of the emergency state includes causing the user device to enable all radios in the user device, including any of cellular technology, Wi-Fi technology, and Bluetooth technology, to determine a location of the user device by use of remote radios and antennas at known locations in an RF distributions platform. First information associated with the user device is obtained, wherein the first information includes location information corresponding to the location of the user device. The first information is then pushed to a public safety answering point.

In a third aspect of the implementations, a method for establishing a mobile call over a wireless network is provided. According to the method, a mobile services engine receives a request to establish a communication path from a user device to a mobile operator network through a wireless access point. The mobile services engine determines whether the user device is authorized to access the wireless access point, wherein the determining includes determining whether a local policy manager or an external policy manager determines access to the wireless access point and pushing, by the mobile services engine via an interface, a request to authorize the user device to the local policy manager or the external policy manager. The method further includes sending, by the mobile services engine in response to the user device being authorized to access the wireless access point, a request to authenticate the user device to the mobile operator network, and a request to authenticate the user device to the mobile operator network, and establishing, by the mobile services engine in response to the user device being authorized, the communication path from the user device to the mobile operator network through the wireless access point.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
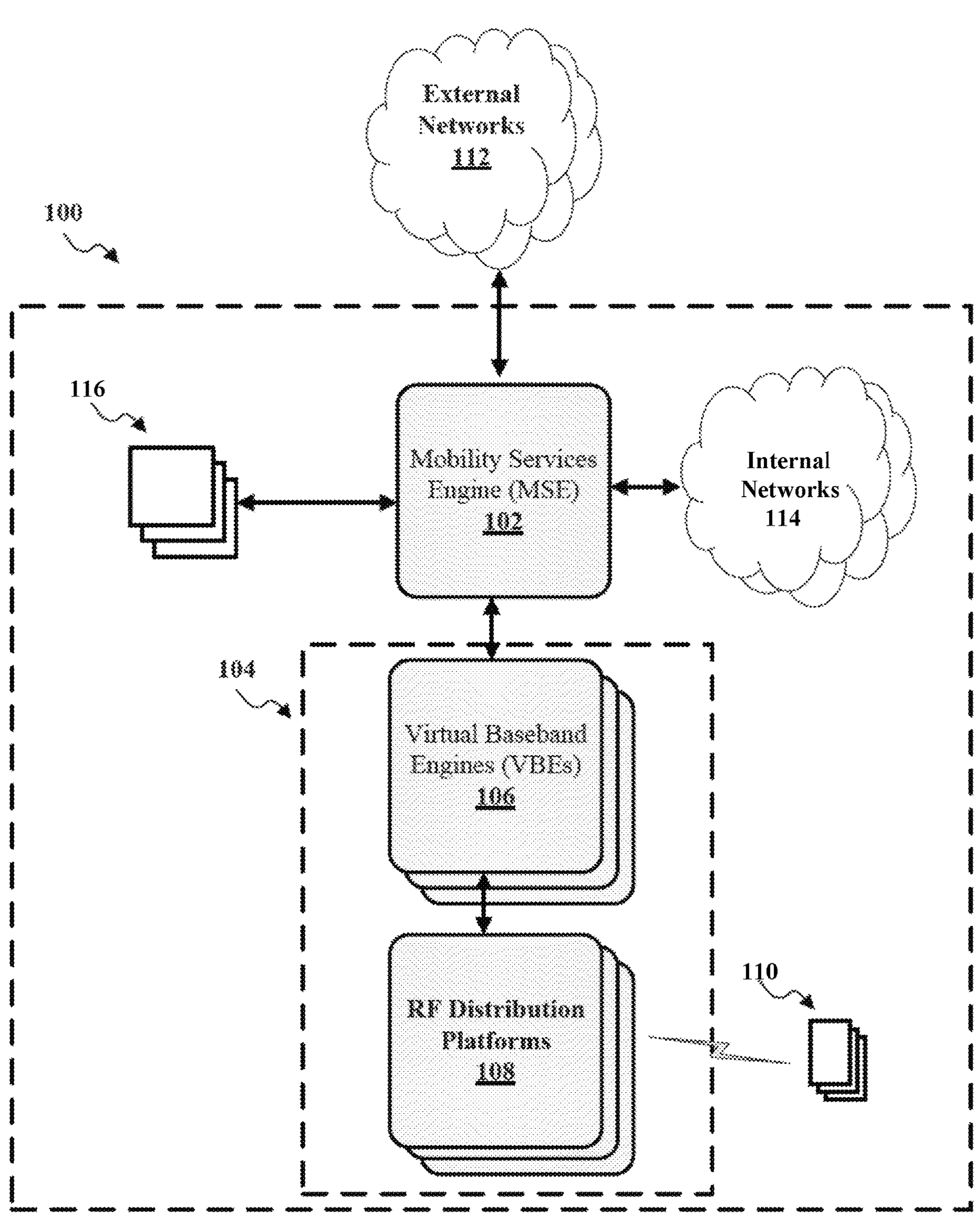
FIG. 1 is a generic diagram that illustrates an example of a location, which can be provided with integrated network services, according to various implementations.

FIG. 1 is a generic diagram that illustrates an example of a location 100, which can be provided with integrated network services, according to various implementations. While FIG. 1 illustrates various components contained in the location 100 and coupled to the location 100, FIG. 1 illustrates one example and additional components can be added and existing components can be removed.

The location 100 may be any type of geographic location, building, house, etc. in which integrated network services can be provided, as described herein. For example, the location 100 can be an office building of a corporation, an apartment building, a multi-dwelling residence, a government building, a city block, a park etc. The location 100 can include a mobile services engine (MSE) 102. The MSE 102 can be configured to coordinate, track, and facilitate network communications internal and external for the location 100. The MSE 102 can be configured to coordinate, track, and facilitate communications between networks, computer system, user devices, etc. located internally within the location 100. Likewise, the MSE 102 can be configured to coordinate, track, and facilitate communications between networks, computer system, user devices, etc. located internally within the location 100 and networks, computer system, user devices, etc. located externally from the location 100. Additionally, the MSE 102 can provide a set of applications programming interfaces (API) for services provided to the location 100, for example, from internal application services or external application services.

In implementations, the MSE 102 can be implemented as software, hardware, or combination thereof. When implemented as software, the MSE 102 can be executed on one or more computer systems, whether virtual, physical, or combinations thereof. For example, physical computer systems can include conventional computer systems, such as those data centers, servers, etc. The physical computer systems can include hardware resources, such as processors, memory, network hardware, storage devices, and the like, and software resources, such as OS, application programs, and the like. Likewise, for example, the virtual computer systems can include virtual machines, cloud computing environments, etc. When implemented as software, the MSE 102 can be written utilizing a variety of programming languages, such as JAVA, C, C++, Python code, hypertext markup language (HTML), extensible markup language (XML), and the like to accommodate a variety of operating systems, computing system architectures, APIs, etc.

The MSE 102 can be configured to provide an interface for and to negotiate network communications for a local mobile network 104. The local mobile network 104 can include one or more virtual baseband engines (VBEs) 106 and one or more radio frequency (RF) distribution platforms 108. The local mobile network 104 can provide service to one or more user devices (UEs) 110 within the location 100. The VBE can provide one or more baseband units (BBUs) to support and control mobile communications with the RF distribution platforms 108. The VBEs 106 can be implemented a software, hardware, or combination thereof, as discussed below. For example, when implemented as software, the VBEs 106 can be executed on one or more computer systems, whether virtual, physical, or combinations thereof. For example, physical computer systems can include conventional computer systems, such as servers used within data centers, etc. The physical computer systems can include hardware resources, such as processors, memory, network hardware, storage devices, and the like, and software resources, such as OS, application programs, and the like. Likewise, for example, the virtual computer systems can include virtual machines, cloud computing environments, etc. When implemented as software, the MSE 102 can be written in a variety of programming languages, such JAVA, C, C++, Python code, hypertext markup language (HTML), extensible markup language (XML), and the like to accommodate a variety of operating systems, computing system architectures, etc. The RF distribution platforms 108 can be any type of radio/antenna platform such as a distributed antenna system (DAS), a remote radio head (RRH), and the like. The RF distribution platforms 108 can be implemented using software, hardware, or combination thereof, as discussed below.

The UEs 110 can be any type of computer systems and devices that are capable of communicating with the local mobile network 104 and/or any other network, internal or external, to the location 100. For example, the UEs 110 can include telephones, mobile phones, laptop computer, server computers, tablet computers, smart appliances, IoT devices, and the like.

In implementations, the VBEs 106 and the RF distributions platforms 108 implementing the local mobile network 104 (and/or the MSE 102) can store, keep track of, and/or otherwise monitor the distribution (e.g., location) of remote radios and antennas in the RF distributions platforms 108, and can identify, monitor, and/or otherwise determine the UEs 110 locations in relation to each radio/antenna of the RF distributions platforms 108. Using this intelligence information, the VBEs 106 and the RF distributions platforms 108 implementing the local mobile network 104 (and/or the MSE 102) can dynamically optimize the allocation of available BBU resources to best serve the location 100. Because the local mobile network 104 can operate as a finely tuned and single system, utilizing one or more wireless technologies and thus maximizing the end user throughput at any point or points across the system.

For example, if location 100 is a venue, such as a football stadium, which is covered by a DAS, the local mobile network 100 can be a single cell covered by multiple antennas of the DAS. In this example, during the second quarter, one of the end-zone sections of the stadium seating may be covered by one specific antenna of the multiple DAS antennas throughout the stadium, and there may be 500 users (e.g., cellphones) being served by that antenna. At the same time, another antenna in a concourse area of the stadium may be serving 20 users because most people are in their seats and the concourse is lightly occupied. When halftime arrives, most of the users the end-zone section, as well as from other sections, may crowd into the formerly lightly occupied concourse section, such that the antenna serving the concourse area now has 700 users, while the antenna serving the end-zone section now has only 50 users because all the others have moved elsewhere. In this example, VBEs 106 and the RF distributions platforms 108 implementing the local mobile network 104 (and/or the MSE 102) can sense a change in user numbers in the end-zone section antenna and in the concourse-area antenna, and react by reallocating cellular resources (e.g., BBU resources) from serving the end-zone section antenna to serving the concourse-area antenna, thus improving the network performance for the users in the concourse-area. In various implementations, this dynamic, situation-responsive functionality can be achieved by the VBEs 106 and the RF distributions platforms 108 implementing the local mobile network 104 (and/or the MSE 102), which determines where BBU resources are needed within a venue or other area covered by a local mobile network 104 and moves, reassigns, or otherwise reallocates BBU resources to meet the current needs.

In implementations, the MSE 102 can be configured to provide an interface for and to negotiate communication between the location 100 and one or more external networks 112. The one or more external networks 112 can be any type of network that utilizes any type of communication protocols or processes. For example, the one or more external networks 112 can be mobile carrier networks (also referred to as mobile operator network), Internet Protocol (IP) based network, and the like. The MSE 102 can be configured to transparently control and negotiate communications between systems and devices and the one or more external networks 112, as discussed further below. The MSE 102 can also be configured to provide one or more interfaces, e.g. application programming interfaces (APIs), to services provided by the one or more external networks 112, as discussed further below.

In implementations, the MSE 102 can be configured to provide an interface for and to negotiate communications with one or more internal networks 114. The one or more internal networks 114 can be any type of network that utilizes any type of communication protocols or processes. For example, the one or more internal networks 114 can be or include wireless access point (WAPs), trusted local area networks (LANs), untrusted LANs, and the like. The MSE 102 can be configured to transparently control and negotiate communications between systems and devices and the one or more internal networks 114, as discussed further below. The MSE 102 can also be configured to provide one or more interfaces, e.g. APIs, to services provided by the one or more internal networks 114, as discussed further below.

In implementations, the MSE 102 can be configured to provide an interface for and to negotiate communication with one or more application services 116. For example, the MSE 102 can provide an APIs for the application services. The application services 116 can be any type of application, functionality, and the like, which can be utilized in the location 100, as described below.

For example, as noted above, the VBEs 106 and the RF distributions platforms 108 implementing the local mobile network 104 (and/or the MSE 102) can store or otherwise keep track of the location of each remote radio and antenna in the RF distributions platforms 108. In some implementations, the MSE 102 can use the radio/antenna-location intelligence information to identify the location of UEs 110 within the area covered by the local mobile network 104, and employ intelligence through other means, such as Wireless Access Point beacons, Bluetooth Beacons, to effectively and in combination utilize proximity and triangulation techniques to achieve user-device location to enable various applications, such as user-device map applications that show a user's current location within a venue and provide directions for the user to follow to arrive at a different location, such as a specific seat, room, meeting, shop, restaurant or the like. Similarly, the determined user-device location can be employed by 911 applications to report the location of the use making a 911 call, or otherwise employed by similar emergency applications. Where and when further enabled by emerging UE standards a 911 call by a user or other emergency state within a location may allow for the MSE and/or VBEs to force an emergency state of the UE, enabling all radios in the UE device, including cellular, Wi-Fi, and Bluetooth technologies, to optimize location intelligence to the benefit of users in an emergency state.

In implementations, the VBEs 106 and the RF distributions platforms 108 implementing the local mobile network 104 (and/or the MSE 102) are configured to provide solutions targeted at a location 100, such as corporate centers or university campuses, that have the ability to roam UEs 110 onto and within the location 100. In some embodiments, the VBEs 106 and the RF distributions platforms 108 implementing the local mobile network 104 (and/or the MSE 102) can handover the UEs 110 using standard inter-RAT and intra-RAT handoff methodologies to enable transparent transitions into and out of serving areas, including to legacy networks outside of the pseudo-private system. As a result, the VBEs 106 and the RF distributions platforms 108 implementing the local mobile network 104 (and/or the MSE 102) allows secure access to local private IP networks that may be affiliated with the location 100.

In some implementations, the VBEs 106 and the RF distributions platforms 108 implementing the local mobile network 104 (and/or the MSE 102) can intelligently identify qualified UEs to utilize the networks and systems of the location 100, whereby the VBE 106 (and/or MSE 102) may optionally implement a Closed Subscriber Group, which shall limit which UEs are allowed to handover to the location 100 based on policies set forth by a configuration of the system, and can also apply special data routing policies to individual UEs 110 to enable users to access various networks and data resources of the location 100, such as: the internet, the operator's IP-core network for things such as high definition voice and video calls or IP Multimedia Subsystem (IMS) services, or local IP network to the location 100, such as internal file stores, databases, and other tools accessible via a secure connection to UEs 110. For example, consider a venue such a corporate campus that is served by an implementation of location 100. In such a venue, it may be desirable to enable employees of the corporation to connect to and access data in the corporation's computers or intranet, while denying such connectivity and access to visitors on the campus who are not corporate employees. In this example, the system may identify the UEs 110 of corporate employees that connect via cellular means to the local mobile network 104, and allow those UEs 110 to access the corporation's computers according to the routing policies for corporate employees. Similarly, the system may identify the UEs 110 of visitors (i.e., non-corporate employees) that connect via local mobile network 104, and prevent those UEs 110 from accessing the corporation's computers. In addition to access rights, the policy may also specify other features or resources to supply or deny to UEs 110, such as an amount of bandwidth, fees for access, and the like.

In some implementations, the special data routing policies may allow access to industrial, Internet of Things (IoT), and Machine to Machine (M2M) environments. For example, the VBEs 106 and the RF distributions platforms 108 implementing the local mobile network 104 (and/or the MSE 102) can provide various communication functions and utility, such as allowing LTE-modem-embedded shipping pallets with localized radio frequency identification (RFID) tagging, which identifies the items on the pallet, to connect and communicate to internal systems as the pallets move through a factory and into shipping trucks.

While FIG. 1. illustrates one MSE 102, the location 100 can include multiple instances of the MSE 102. For example, multiple instances of the MSE 102 to communicate with different local mobile networks 104, different external networks 112, different internal networks 114, different application services 116, and the like.

Figure 2:
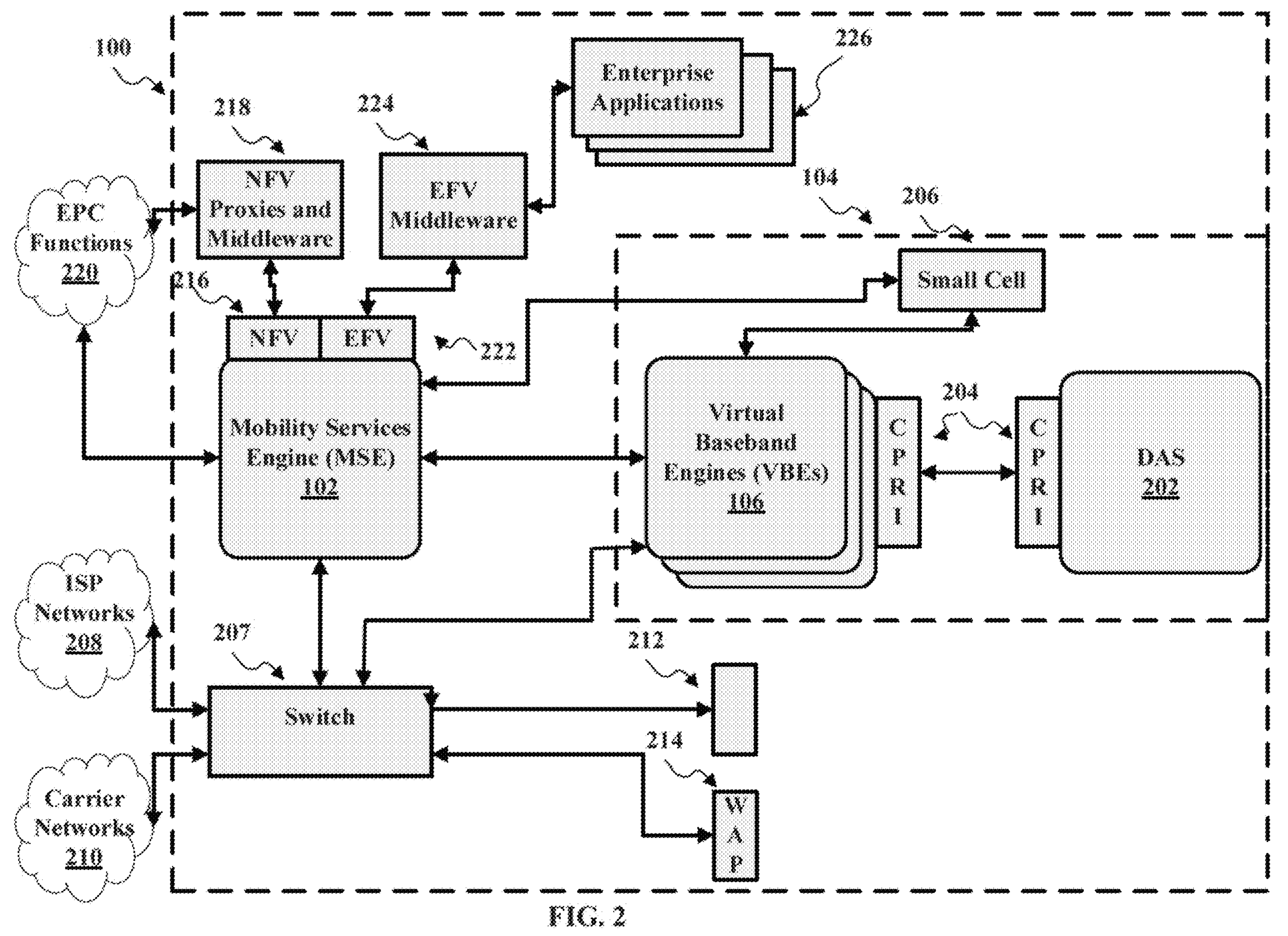
FIG. 2 is a diagram that illustrates a more detailed example of the location, which can be provided with integrated network services, according to various implementations.

FIG. 2 is a diagram that illustrates a more detailed example of the location 100, which can be provided with integrated network services, according to various implementations. While FIG. 2 illustrates various components contained in the location 100 and coupled to the location 100, FIG. 2 illustrates one example and additional components can be added and existing components can be removed.

As illustrated in FIG. 2, the local mobile network 104 can include a DAS 202 coupled to the VBEs 106. For example, the VBEs 106 can be coupled to the DAS 202 via a digital interface, such as a common public radio interface (CPRI) interface 204.

The local mobile network 104 can include one or more additional small cell systems 206 coupled the VBEs 106. For example, small cell systems 206 can include existing hardware such as donor antennas, EnodeB's, small cells, and the like as additional RF sources as well as incorporating the BBU (VBEs 106) technology, for example. Inputs from these devices can be 2G, 3G, 4G, public safety, etc. radio frequency and are agnostic to the carrier frequency, manufacturer and/or type of equipment. Accordingly, the local mobile network 104 may utilize existing network infrastructure to IP-based, managed systems, e.g., while continuing to capitalize on at least some previously-implemented hardware, software, etc.

The VBEs 106 can be configured to coordinate and control mobile communication with the local mobile network 104. The VBEs 106 can gather intelligence information about the DAS 202 usage by users and the current system resources (e.g., BBU resources), and use that intelligence information to reallocate system resources to better serve the current users, for example, UEs. The intelligence information can include information regarding the identity, service capabilities for (e.g., type of device, its LTE capabilities, ability to offer Voice over LTE, multi-path radio capabilities, etc.), and location of user equipment (e.g., smartphones or IoT devices) and user-equipment sessions that are wirelessly connected to (e.g., roamed onto) the DAS 202 and each specific sub-element of the DAS 202 (e.g., each antenna, remote radio unit, coverage area, and the like). The VBEs 106 can collect and store information about the amount, capacity, and current allocation of BBU resources, across pools of BBU processors, which may be rack units, and have knowledge of available baseband frequencies, frequency bands, power output, bandwidth, sessions, channels, processing cycles or time, digital signal processing capacity, registered and active users or devices, device types, and the like.

The location 100 includes a switch 207, whereby such switch may be an externally programmable device or an integral element of the MSE. For example, the switch 207 can be an independent software defined networking (SDN) switch. The switch 207 can be dynamically configured by the MSE to setup certain packet level routing paths for network communication between systems and devices within the location 100, for example, the local mobile network 106, a local area network 212, and wireless access points (WAPs) 214, and networks external to the location 100, for example, internet service provider (ISP) networks 208 and mobile carrier networks 210.

In implementations, the MSE 102 can be configured to communicate with the VBEs 106 and a switch or switches 207. The MSE 102 can be configured to transparently negotiate and control the network communication handled by the VBEs 106 and the switch 207 as discussed further below. Additionally, the MSE 102 can be configured to collect, store, and utilize data and intelligence information from the VBEs 106.

In implementations, the MSE 102 can be configured to include a network functions virtualization (NFV) interface 216. For example, the NFV interface 216 can be one or more APIs that enable functionality of one or more NFV proxies and/or middleware 218. In some implementations, the NFV interface 216 can be utilized by the MSE 102 and the NFV proxies and middleware 218 to implement evolved packet core (EPC) functions 220, for communication over network standards, such as 3GPP LTE wireless communication standard. For example, the EPC functions 220 can include certain information for the registration and policies of UEs, mobile handoff coordination of UEs, authentication of UEs, certain services enabled or allowed by a UE and related policies to be applied, packet redirection internally, externally, or both for location 100, and the like. The MSE 102 can be configured to implement and communicate via the NFV interface 216 using any type of protocol, for example, JAVA script object notation (JSON), XML, and the like.

In implementations, the MSE 102 can be configured to include an enterprise function virtualization (EFV) interface 222. For example, the EFV interface 222 can be one or more APIs that enable functionality of one or more EFV middleware 224 and one or more enterprise application 226. In some implementations, the EFV interface 222 can be utilized by the MSE 102, EFV middleware 224, and enterprise application 226 to implement application services within the location 100, as discussed further below. For example, the application services can include packet redirection internally, externally, or both for location 100, policy control for the location 100, emergency services for the location 100, enhance user experience at location 100, and the like. The MSE 102 can be configured to implement and communicate via the EFV interface 222 using any type of protocol, for example, JAVA script object notation (JSON), XML, and the like.

FIGS. 3A-3E are diagrams that illustrates an example of the local mobile network, for example local mobile network 104, according to various implementations. While FIGS. 3A-3E illustrate various components contained in the local mobile network and coupled to the local mobile network, FIGS. 3A-3E illustrate one example and additional components can be added and existing components can be removed.

Figure 3A:
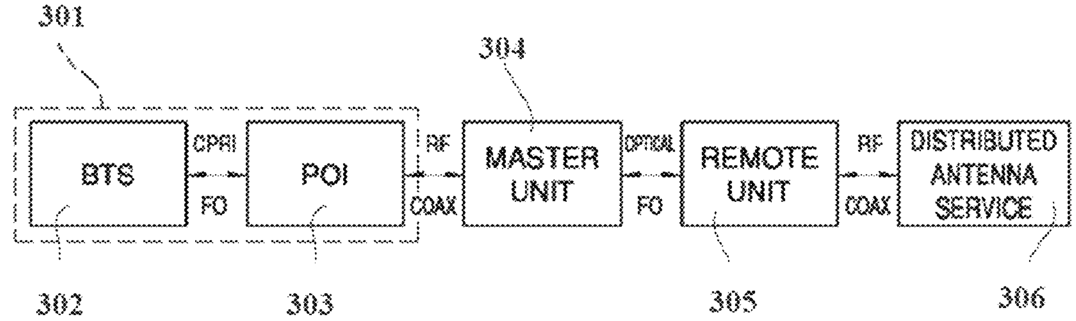
FIGS. 3A-3E are diagrams that illustrates an example of a local mobile network, according to various implementations.

As illustrated in FIG. 3A, globally indicated with reference number 301 is a system for the distribution of wireless signals in telecommunication networks, for example, the local mobile network 106 in the location 100, particularly for providing a baseband unit (BBU) functionally integrated with a distributed antenna system (DAS). In some implementations, the system 301 can provide greater flexibility, modularity and future-proof architectures, by implementing the following features:

- integration into the system 301 of the functionality for the generation of the signal to be distributed;
  - realization of communication links, for example, propriety optical links, based on a high speed CPRI or Ethernet standard;
  - integration into the system 301 of all existing technologies (2G, 3G, 4G), by creating a framework that can handle even future technologies (5G).

In this way, the system 301 can provide a solution for the realization of the base stations that are innovative from the economic point of view (cost reduction and economies of scale), from an engineering point of view (computational and dynamic utilization efficiency) and from the environmental point of view (efficiency and energy saving).

As shown schematically in FIG. 3A, the system 301 includes two blocks 302 and 303 closed in the dotted rectangle and related to the base station BTS (or BBU or eNodeB depending on the technology used, i.e., 2G, 3G, 4G) and the Point Of Interface (POI) of a DAS system. In some examples, the system 301 can be easily integrated into the conventional structures of a DAS. In some implementations, the system 301 can be partially integrated with the DAS and operatively connected with the conventional master unit 304 of the DAS itself. The master unit 304 can be connected through an optical fiber connection to a remote unit 305. The master unit 304 can perform an RF-to-optical conversion and vice versa, while the remote unit 305 can perform signal amplification and optical-to-RF conversion and vice versa. The remote unit 305 can be further connected to a distributed antenna system 306 for the distribution of signals.

Figure 3B:
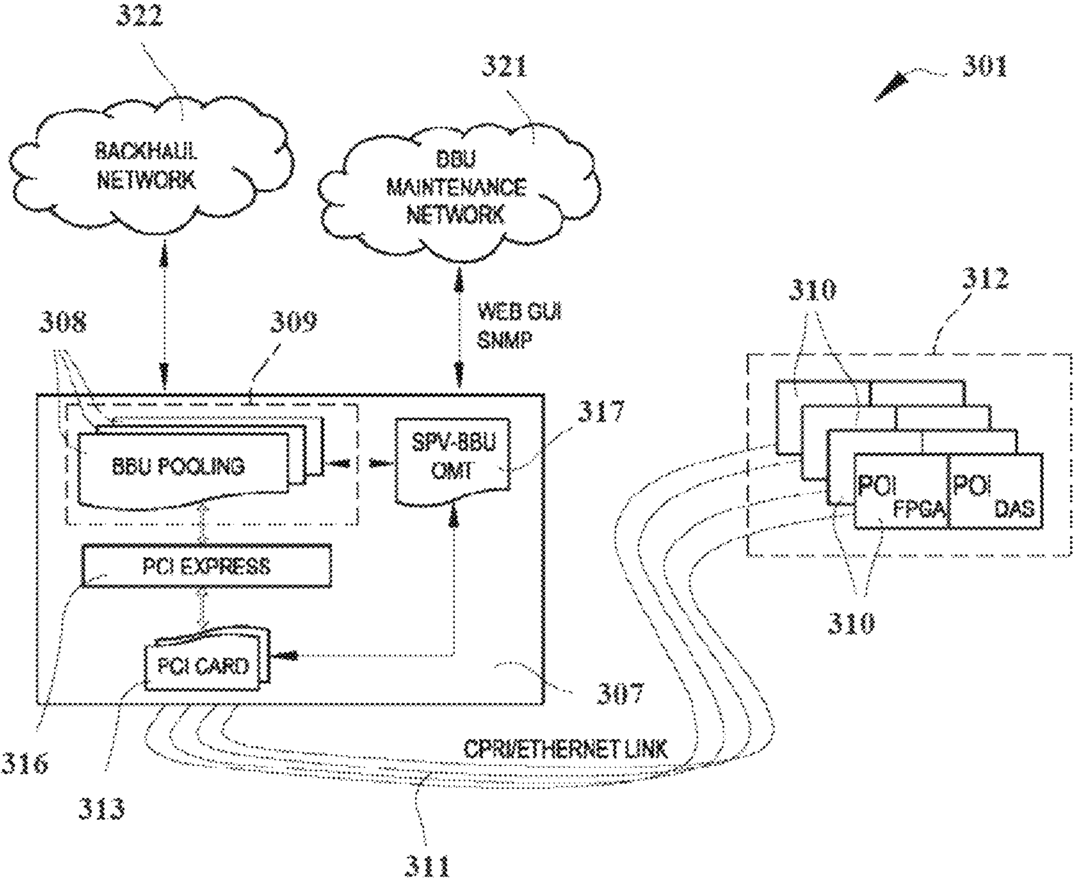
Figure 3C:
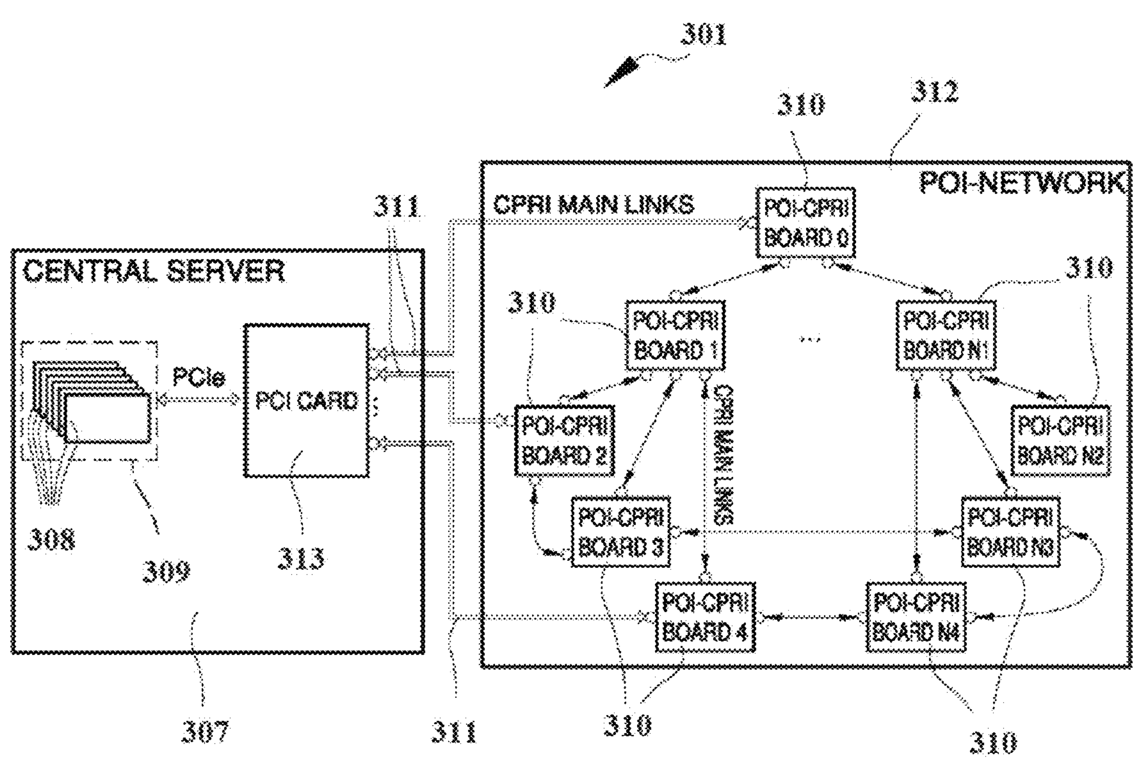

FIGS. 3B and 3C are block diagrams that illustrate an example of the architecture of the system 301. As illustrated, the system 301 provides an architecture composed of the following components:

- one or more central server 307 provided with one or more a baseband unit 308 (BBU) via VBEs, for example, implemented with BBU pooling software 309;
- one or more point of interface units 310 connected with a DAS to distribute the signal received from the baseband unit 308 in areas, for example, areas with high density of users; and
- one or more an interface links 311 connected with the central server 307 and with said the one or more point of interface units 310.

For example, the system 301 includes a point of interface network 312 provided with a plurality of the point of interface units 310 that interface with the central server 307 via the interface links 311 and which is connected with the DAS to distribute the signal received from the BBU 308 in areas, for example, areas with high density of users.

The interface link 311 includes a plurality of optical connecting links. The communication through the connecting links 311 can be implemented by means of protocol of the CPRI and/or Ethernet type. The system 301 comprises a plurality of BBU 308 realized via a BBU pooling software 309 configured on the central server 307.

The system 301 provides the possibility to realize on the central server 307 a set of BBU 308, called BBU-pool. The BBU pooling software 39 for the implementation of the BBU-pool can be, for example, a type of a software radio. The central server 307 can be, for example, one or more physical computer systems or virtual computer systems, as discussed above. In some implementations, the number of BBUs 308 implemented on the central server 307 can depend on the number of processors of the computer on the central server 307, itself. The central server 307 of the system 301 can include one or more electronic connection cards 313 and one or more digital CPRI links (or an Ethernet links) between the BBU-pool 308 and the electronic connection cards. In some implementations, the electronic connection card 313 can be a PCI card.

The electronic connection card 313 can be equipped with an Field Programmable Gate Array (FPGA) chip 314 capable of ensuring high performance (in terms of clock rates used, power consumption, etc.) The electronic connection card 313 can include one or more CPRI links 315 (or an Ethernet links). The CPRI links 315 perform the transmission/reception on fiber of the base band signal and implements the merging of CPRI and Ethernet data.

For example, the electronic connection card 313 can be provided with four CPRI links 315 (or Ethernet links) connected to corresponding optical connecting links 311. While illustrated with four links, the electronic connection card 313 can include more than four CPRI links 315. In some implementations, the CPRI links 315 on the electronic connection card 313 can be a type of CPRI Master links.

The BBU-pooling software 309 interfaces with the electronic connection card 313 through an interface unit 316, for example, a PCI Express interface, and with supervision software 317 that acts as supervision of central server 307 and POI-Network 312.

The connecting links 311 connect the electronic connection card 313 of the central server 307 with the point of interface unit 310 of the DAS. In some implementations, the point of interface units 310 can be implemented by means of dedicated POI-CPRI boards. In some implementations, the connecting links 311 are constituted by high-speed optical links with CPRI/Ethernet protocol.

The POI-CPRI boards 310 are implemented using FPGA boards 318, which allow both the management of the connecting links 311, both the implementation of re-programmable and re-configurable circuitry, such as digital filtering and adaptive modulation/demodulation of the signal. In some implementations, the POI-Network 312 can consist of several POI-CPRI boards 310 equipped with a plurality of ports 319 connected to respective connecting links 311. The POI-CPRI boards 310 can be equipped also with a plurality of ports 320 connected to respective connecting links 311.

In some implementations, the POI-CPRI boards 310 can be provided with CPRI slave interfaces and CPRI master interfaces. As shown in FIG. 3, the POI-CPRI boards 310 can be connected to the PCI card 313 through CPRI Slave interfaces and are also interconnected each other through CPRI Master/Slave interfaces. The type of the POI CPRI/Ethernet links of the POI-CPRI boards 310 can be dynamically reconfigurable as a function of the fact that they must be of Master or Slave type. This makes it possible to create a fully interconnected network between the various POI-CPRI boards 310 which has advantages in terms of routing, sustainability and redundancy of the connecting links 311 in case of malfunctions/loss of one or more links.

The BBU pooling software 309 can realizes the virtualization of the BBU-pool 308 or eNodeB (eNB) system. In this way the BBU-pool 308 (or eNB) can be hardware independent (it does not require a dedicated hardware) but it can be installed on server machine scalable in terms of CPU power. For example, depending on CPU power, the BBU pooling is able to manage from one to tens of LTE 20 MHz MIMO 2×2 carriers. The BBU pooling software 309 can be configured, managed and monitored via a supervision software 317 that realizes the OMT (Operational and Maintenance Terminal) via a web based GUI and via a BBU maintenance network 321. With the same web based GUI it can be possible to configure, manage and monitor the POI-CPRI boards 310 up to the DAS platform interface. In some implementations, the DAS platform itself can be managed by a similar but separated web GUI to keep BBU-pool 308 and DAS platform independently manageable.

In some implementations, through OMT web pages, it is possible to manage the LTE datastream coming from operator backhaul network 322 to the I/Q drivers and from I/Q drivers to distribute the LTE data to the destination POI-CPRI boards 310 through connecting links 311. In this way, on each POI-CPRI board 310, it is possible to generate the RF signal related to the desired band and sector, then this signal will drive the DAS. This platform is flexible, fully configurable and perfectly fits the multiband/multioperator DAS platform.

Concerning the electronic connection card 313, it is preferably constituted by a FPGA card 314. For example, the electronic connection card 313 can be constituted by a software reprogrammable circuitry inserted within the central server 307 through a PCI Express interface 316 of the latest generation. The electronic connection card 313 packs the stream of base-band data generated by the BBU pooling software 309 and received via the PCI Express interface 316, according to the CPRI/Ethernet standards, in order to interface to the POI-CPRI boards 310 of the POI-Network 312.

Figure 3D:
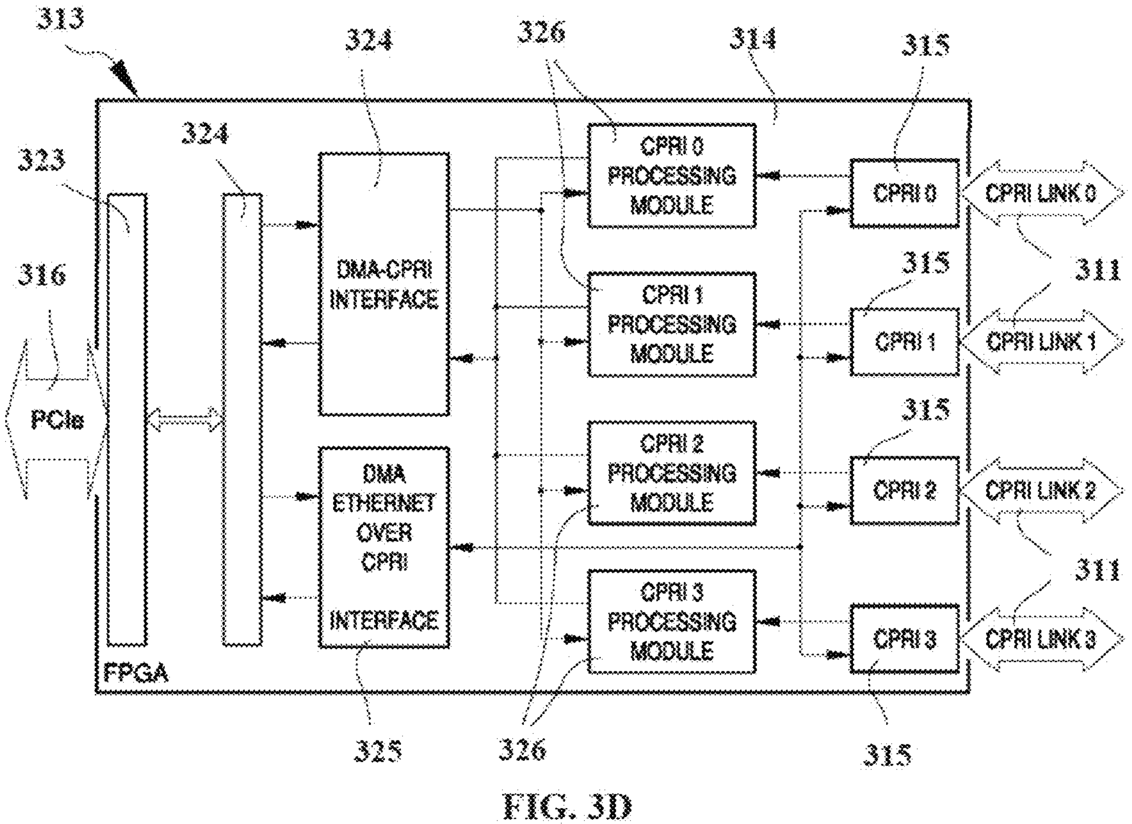

A more detailed diagram of the circuitry implemented on the electronic connection card 313, for example, a PCI Card, is shown in FIG. 3D. The FPGA board 314 implement a PCI-Express communication interface 323. Furthermore, the FPGA board 314 comprises a memory management unit 324 of the Direct Memory Access (DMA) type for managing memory accesses to/from the central server 307 memory and from/to the memory on the FPGA board 314.

The FPGA board 314 further includes custom interfaces to align the format of the three different data interfaces and PCIe, DMA and CPRI, and other custom algorithms of signal processing to organize, optimize and tailored stream of data with respect to the POI-Network 312. The FPGA board 314 also comprises organization units 326 for organizing data according to the CPRI standard. In some implementations, the organization units 326 performs A×C IQ data mapping, interleaving frame and synchronization management.

Figure 3E:
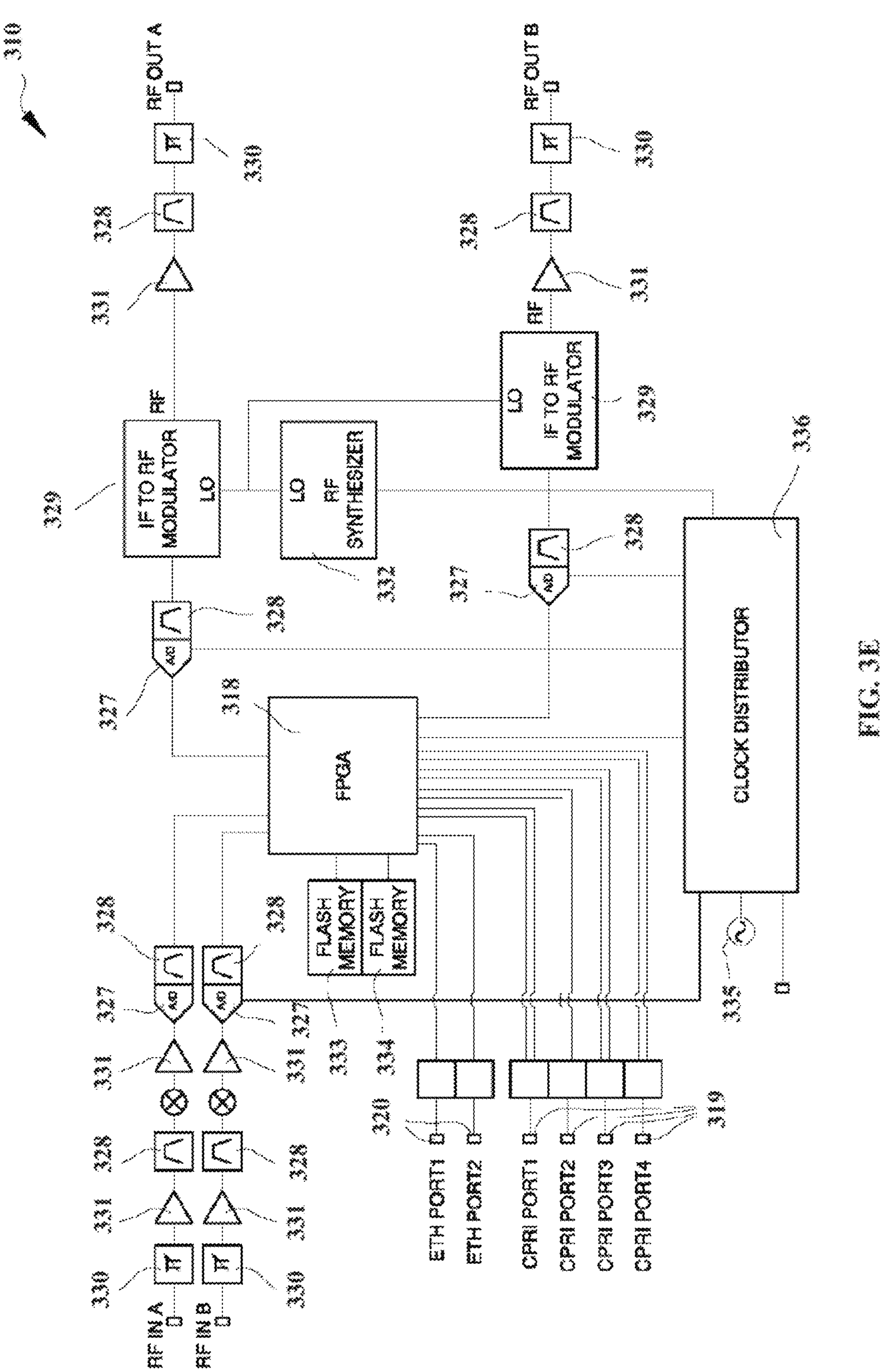
Figure 4:
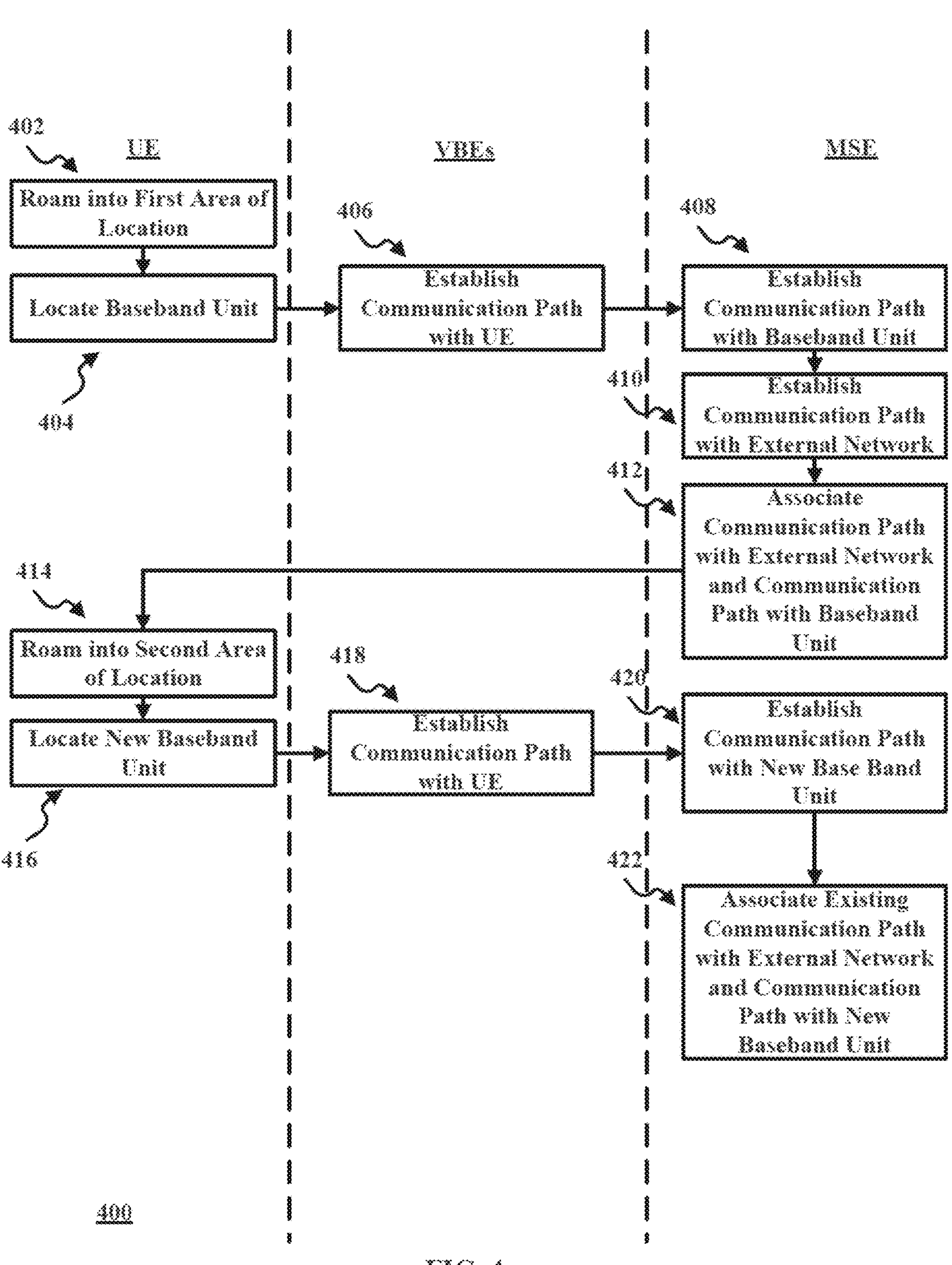
FIG. 4 and FIGS. 5A-5C illustrate an example of a method for baseband aggregation routing, according to various implementations.

An example of a hardware architecture of a POI-CPRI Board 310 is shown in detail in FIG. 3E. The POI-CPRI board 310 can include the following components:

- four SFP+ ports 319 for the four CPRI link;
- two 1-Gigabit Ethernet ports 320, one to provide a Wi-Fi type access by connecting an access-point and the other as a local Ethernet port for maintenance and debugging;
- components and circuitry for signal transmission in the Downlink path and Uplink path, including blocks 327 for the analog/digital conversion and digital/analog conversion, blocks 328 for filtering, IF/RF modulators 329, attenuators 330, amplifiers 331, RF synthesizer 332, flash memory 333, DDR memory 334, oscillators 335 and a Clock distributor 336; and
- an FPGA board 318 with integrated hardware microprocessors.

The FPGA board 318 can perform the following functions:

- digital signal reception/transmission from the A/D converter and to the D/A converter;
- digital signal reception/transmission from CPRI Slave/Master interfaces;
- Master/Slave configuration of CPRI interfaces;
- routing from/to CPRI interface of the signal and of the Ethernet link encapsulated in the CPRI;
- programming of all the circuitry of the board;
- digital filtering;
- conversion from intermediate frequency to base-band and from base-band to intermediate frequency;
- various algorithms of signal processing;
- monitoring the functioning of all the devices mounted on the board;
- automatic alarm management; and
- communication via Ethernet encapsulated in the CPRI links with the supervision of the Central Server software routines.

The realization of the BBUs in software on the central server allows: cost savings for production operators; savings production materials and physical dimensions apparatus; energy saving; intercommunication between multiple BBU; and use of a FPGA board for the management of the CPRI link high speed. Furthermore, the realization of the specific digital and interconnected CPRI-POI boards allows: the communication between the various boards with optical CPRI links; the ability to reroute traffic dynamically; and high flexibility and re-configurability of the POI network; and re-programmability of the individual CPRI-POI board through the use of FPGA boards.

Because the integrated BBU/DAS system operates as a finely tuned and single system, it can minimize the disadvantageous of consistent soft-handover states that typically occur in when users are traversing across numerous small cells, while maximizing the end user throughput at any point or points across the system. The integrated BBU/DAS system allows to store, keep track of, and/or otherwise monitor the distribution of remote radios and antennas in the DAS, and may identify, monitor, and/or otherwise determine the end users' (e.g., cellphones) localizations in relation to each DAS radio/antenna. Using this intelligence information, the system can dynamically optimize the allocation of available BBU resources to best serve the locations of these different user communities.

FIG. 4 and FIGS. 5A-5C illustrate an example of a method 400 for baseband aggregation routing, according to various implementations. The illustrated stages of the method are examples and that any of the illustrated stages can be removed, additional stages can be added, and the order of the illustrated stages can be changed.

Figure 5A:
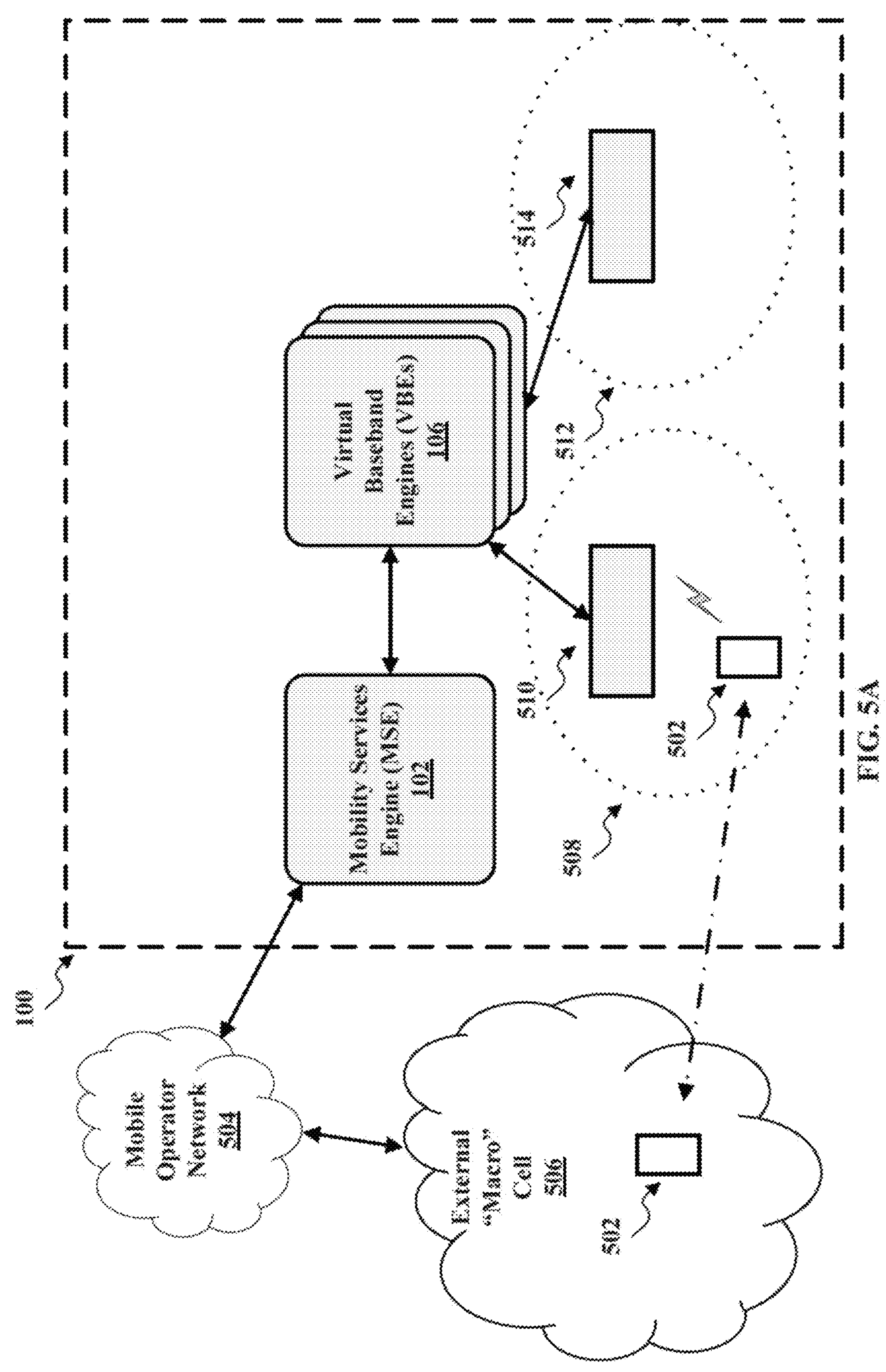

In 402, a UE roams into a first area of a location. For example, as illustrated in FIG. 5A, a UE 502 can be receiving mobile services from a mobile operator network 504 via an external "macro" cell 506. The UE 502 can enter a first area 508 of the location 100. For example, the location 100 can be an office building and the first area 508 can be the lobby of the office building.

In 404, the UE locates a baseband unit. For example, as illustrated in FIG. 5A, once the UE 502 enters the first area 508, the UE 502 can detect a radio signal from a RF unit 510 coupled to the one or more of the VBEs 106. For instance, the UE 502 can activate a search for a radio signal. Once the UE 502 enters the area 508, the UE 502 can detect the radio signal from the RF unit 510 and attempt to establish a connection with a baseband unit of the VBEs 106.

Figure 5B:
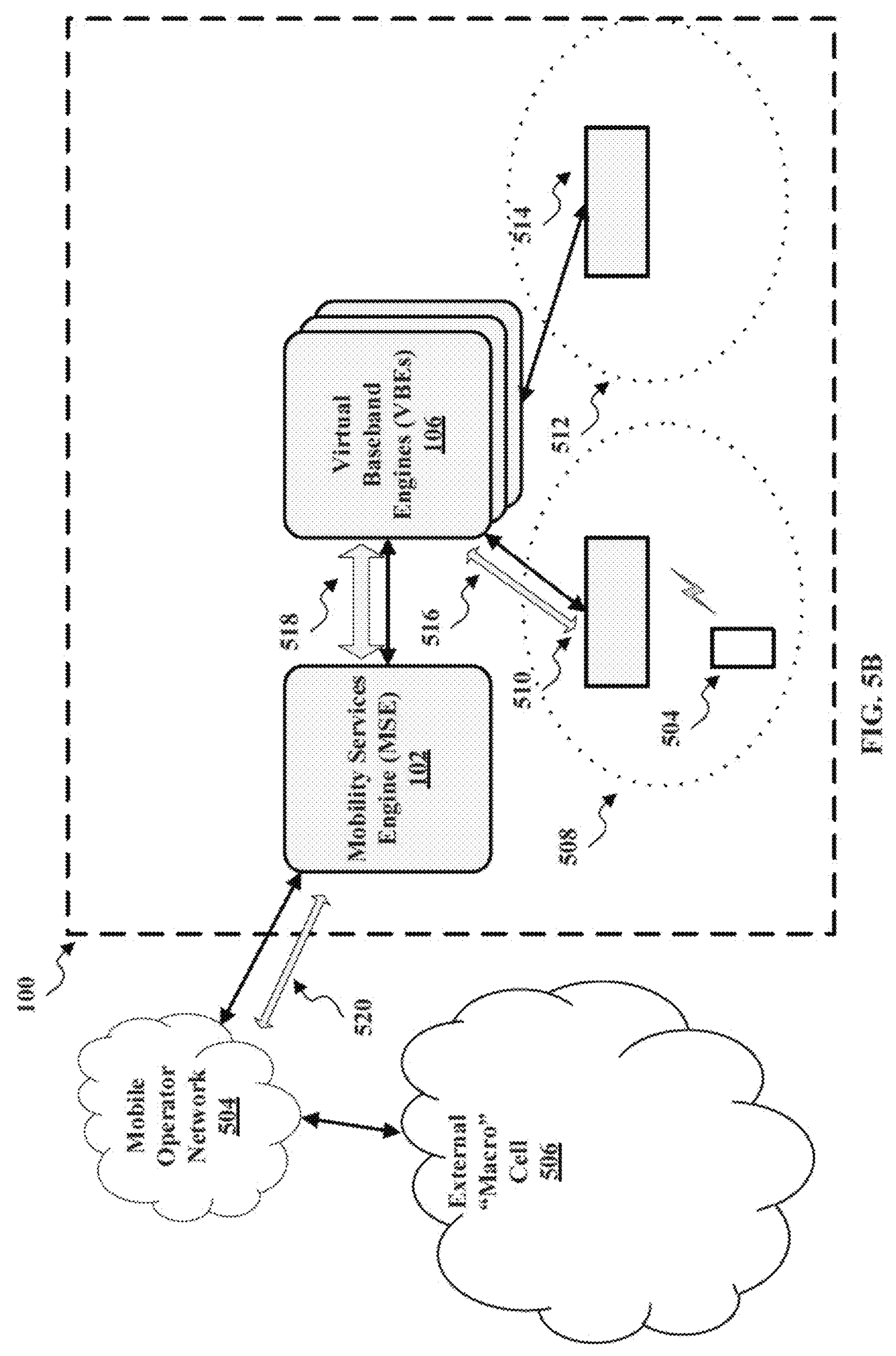

In 406, the baseband unit establishes a communication path with the UE. For example, the baseband unit of the VBEs 106 can authenticate the UE 502 and register the UE 502 with the VBEs 106. The VBEs 106 can authenticate the UE 502 with the mobile operator network 504 via the MSE 102. As illustrated in FIG. 5B, once the UE 502 has been authenticated, the VBEs 106 can establish a communication path 516 with the UE 502. The communication path 516 can be any type of mobile communication path or session. For example, the communication path 516 can be a 3GPP LTE wireless communication which includes three tunnels, e.g., voice, data, and control.

In 408, the MSE establishes a communication path with the baseband unit. For example, as illustrated FIG. 5B, the MSE 102 can establish a communication path 518 with the VBEs 106. The communication path 518 can be the same type of communication path as communication path 516. In 410, the MSE 102 establishes a communication path with an external network. For example, as illustrated FIG. 5B, the MSE 102 can establish a communication path 520 with the mobile carrier network 504. The communication path 520 can be the same type of communication path as communication path 516 and 518. In 412, the MSE associates the communication path with the external network and the communication path with the baseband unit. In implementations, the MSE 102 operates in coordination with VBEs 106 to establish the complete communication path to the mobile carrier network 504 in near-real time. Additionally, the MSE 102 can operate transparently so that the UE 502 and the mobile carrier network 504 appear to make a normal mobile connection.

Figure 5C:
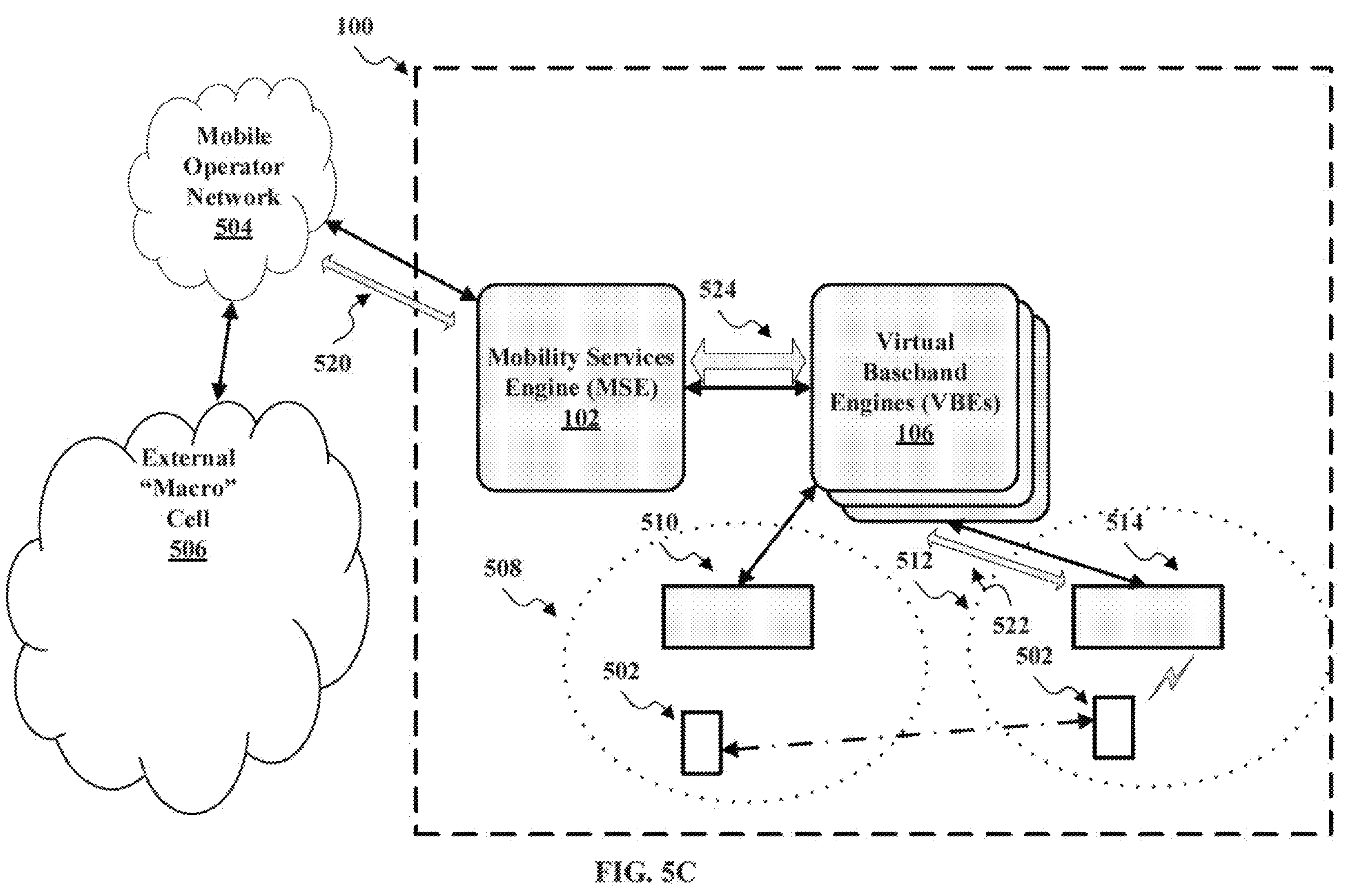

In 414, the UE may roam into a second area of the location. For example, as illustrated in FIG. 5C, the UE 502 can roam into a second area 512 of the location 100, for instance, a different room or floor of the location 100.

In 416, the UE locates a new baseband unit. For example, once the UE 502 enters the second area 512, the UE 502 can detect a radio signal from a RF unit 514 coupled to the one or more of the VBEs 106. For instance, the UE 502 can activate a search for a radio signal. Once the UE 502 enters the second area 512, the UE 502 can detect the radio signal from the RF unit 512 and attempt to establish a connection with a new baseband unit of the VBEs 106.

In 418, the new baseband unit establishes a communication path with UE. For example, the baseband unit of the VBEs 106 can authenticate the UE 502 and register the UE 502 with the VBEs 106. The VBEs 106 can authenticate the UE 502 with the mobile operator network 504 via the MSE 102. Likewise, the original baseband unit can hand over the UE 502 to the new baseband unit using a protocol such as X2. As illustrated in FIG. 5B, once the UE 502 has been registered, the VBEs 106 can establish a communication path 522 with the UE 502.

In 420, the MSE establishes a communication path with the new baseband unit. For example, as illustrated FIG. 5C, the MSE 102 can establish a communication path 524 with the VBEs 106. The communication path 524 can be the same type of communication path as communication path 522.

In 422, the MSE associates the existing communication path with the external network with the communication path with the new baseband unit. For example, the MSE 102 can associate the existing communication path 520 with the communication paths 522 and 524. In implementations, the MSE 102 operates in coordination with VBEs 106 to establish the complete communication path to the mobile carrier network 504 in near-real time. Additionally, the MSE 102 can operate transparently so that the UE 502 and the mobile carrier network 504 appear to make a normal mobile connection.

Figure 6:
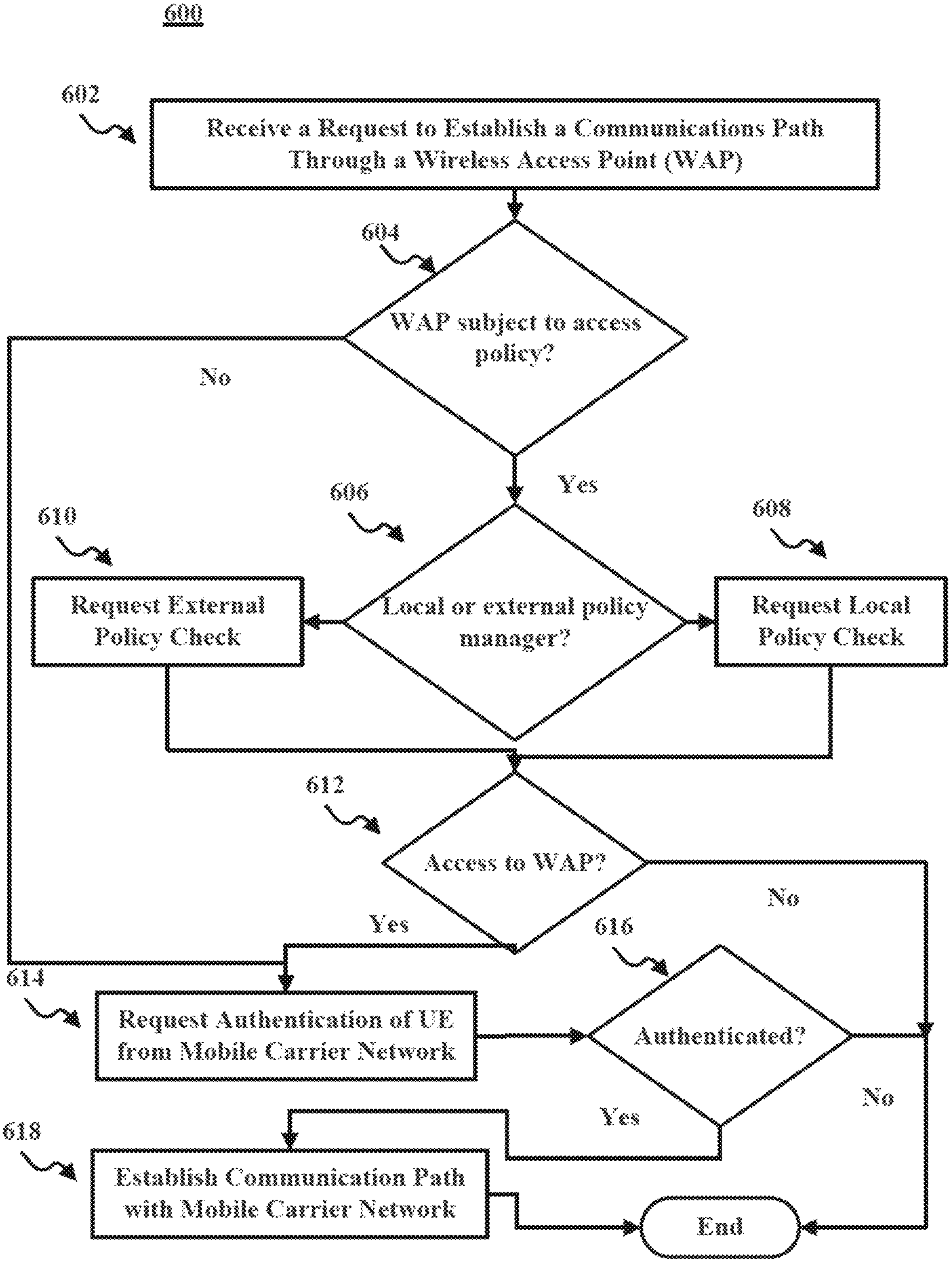
FIG. 6 and FIG. 7 illustrate an example of a method for establishing a connection through a WAP, according to various implementations.
Figure 7:
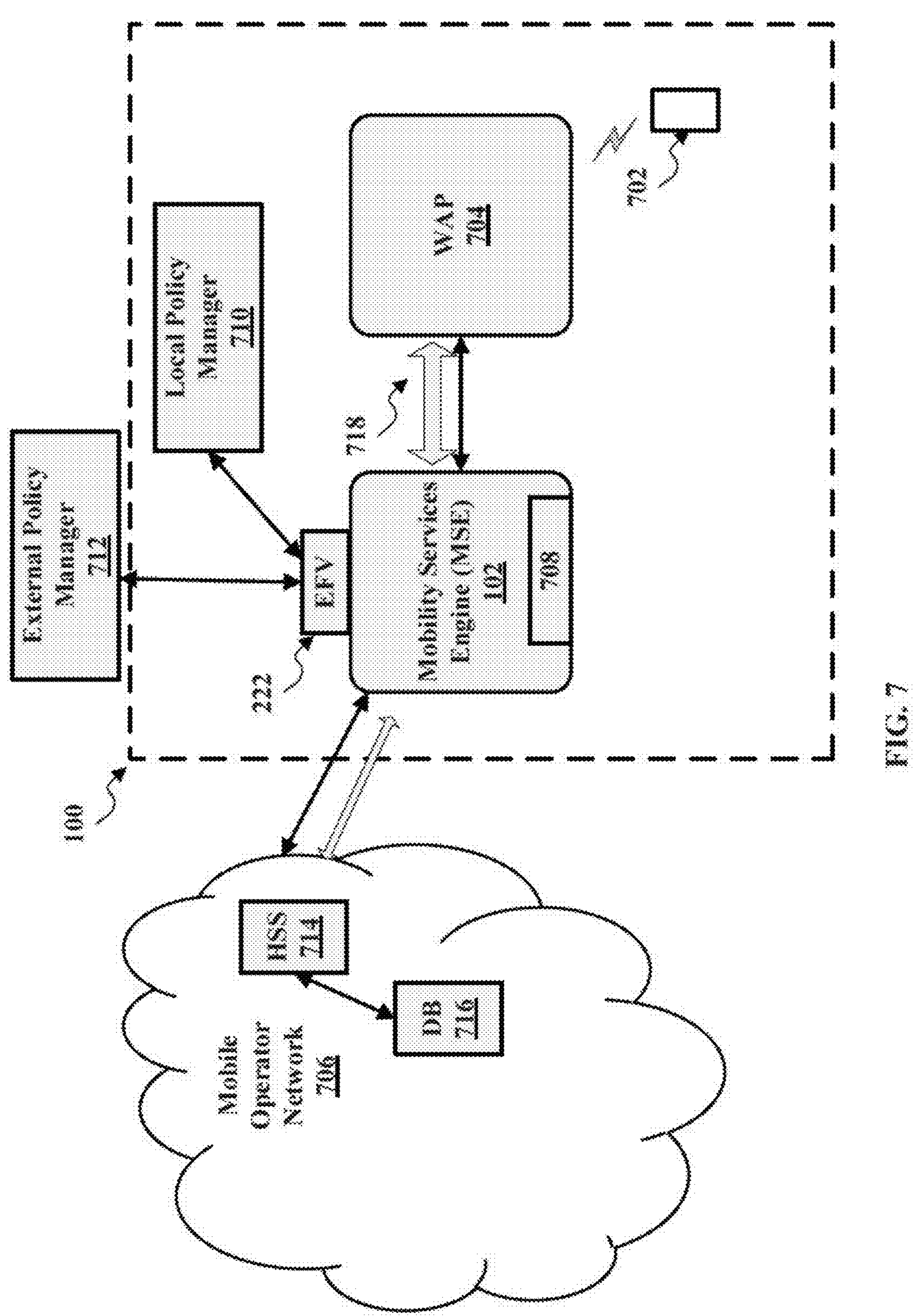

FIG. 6 and FIG. 7 illustrate an example of a method 600 for establishing a connection through a WAP, according to various implementations. The illustrated stages of the method are examples and that any of the illustrated stages can be removed, additional stages can be added, and the order of the illustrated stages can be changed.

In 602, the MSE receives a request to establish a communication path through a WAP. For example, as illustrated in FIG. 7, a UE 702 can be in location 100 and can send a request to establish a communication path through a WAP 704 to a mobile operator network 706. The UE 702 can communicate with the WAP 704 using any type of wireless communication protocol. The communication path can be any type of communication path, for example, voice over IP.

In 604, the MSE determines whether the WAP is subject to an access policy. For example, the location 100 may allow only certain defined groups of UEs to access the WAP 704. To determine policy compliance, the MSE 102 can include a policy engine 708. The policy engine 708 can be configured to determine whether the WAP 704 is subject to a policy and to determine the appropriate policy manager to check. For example, the policy engine 708 can maintain a record of WAPs subject to policy management and can compare identification information for the WAP 704 to the record.

If the WAP is subject to policy management, in 606, the MSE determines whether the policy is governed by a local or external policy manager. For example, as illustrated in FIG. 7, the MSE 102 may provide the EFV interface 222 to a local policy manager 710 and a external policy manager 712.

If the policy is governed by a local policy manager, in 608, the MSE sends a policy check request to the local policy manager. For example, the MSE 102 can send a policy check request to the local policy manager 710 via the EFV interface 222. The policy check request can include information that identifies the UE 702 and the WAP 704.

If the policy is governed by an external policy manager, in 610, the MSE sends a policy check request to the external policy manager. For example, the MSE 102 can send a policy check request to the external policy manager 712 via the EFV interface 222. The policy check request can include information that identifies the UE 702 and the WAP 704.

In 612, the MSE determines whether the UE can access the WAP. For example, the MSE 102 can receive a response from the local policy manager 710 or the external policy manager 712 that indicates whether the UE 702 can access the WAP 704.

If the UE is authorized, the MSE sends a request for authentication of the UE from the mobile carrier network. For example, as illustrated in FIG. 7, the MSE 102 can send a request to a home subscriber server (HSS) 714. The request can include an identification of the UE 702, for example, an identification of a SIM card of the UE 702. The MSE 102 can send the request via an interface, for example, the NFV interface 216. The HSS 714 can communicate with a subscriber database 716 to determine whether to authenticate the UE 702.

In 616, the MSE determines whether the UE is authenticated to aces the mobile carrier network. For example, the MSE 102 can receive a response from the HSS 714 that indicates whether the UE 702 can access the mobile carrier network 706. The response can also indicate that the UE 702 can establish a connection path through the WAP 704.

If the UE is authenticated, in 618, the MSE establishes a communication path to the mobile carrier network. For example, the MSE 102 can establish a communication path 718 through the WAP 704.

Figure 8:
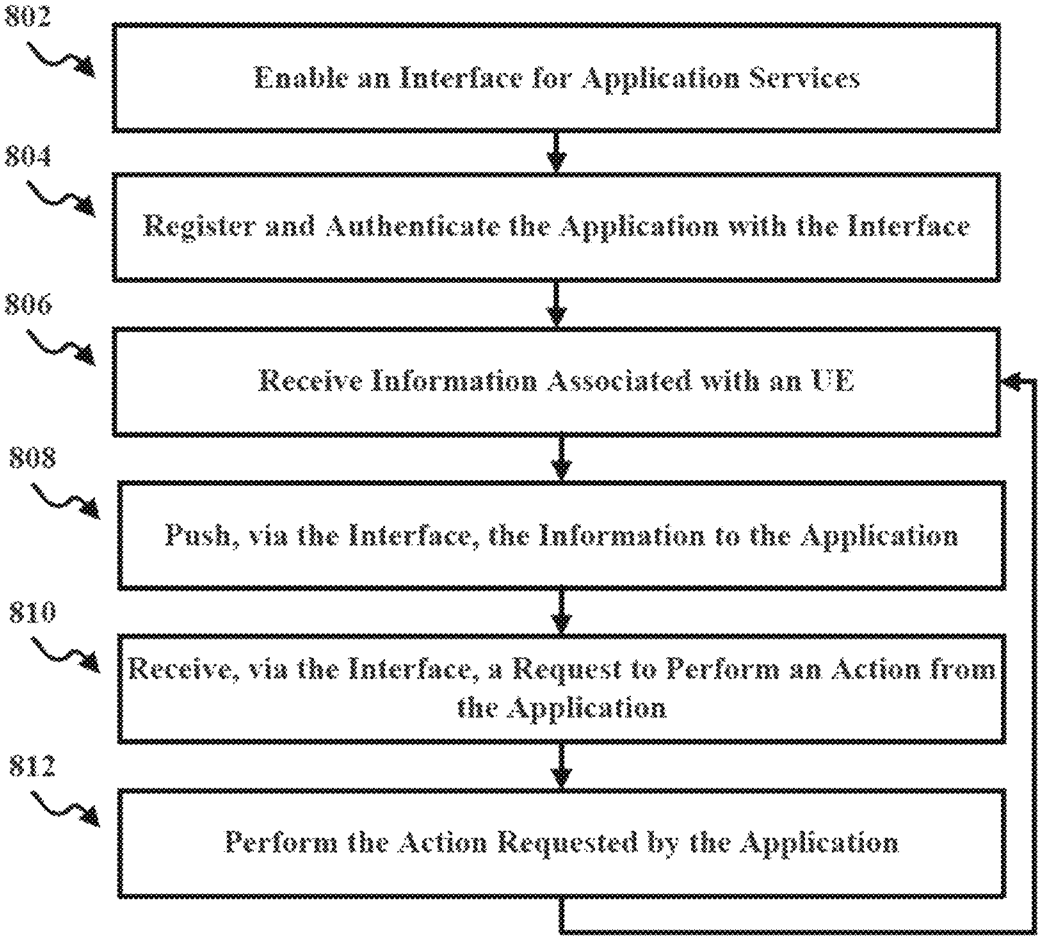
FIG. 8 and FIGS. 9A and 9B illustrate an example of a method of for providing services to a location, according to various implementations.
Figure 9A:
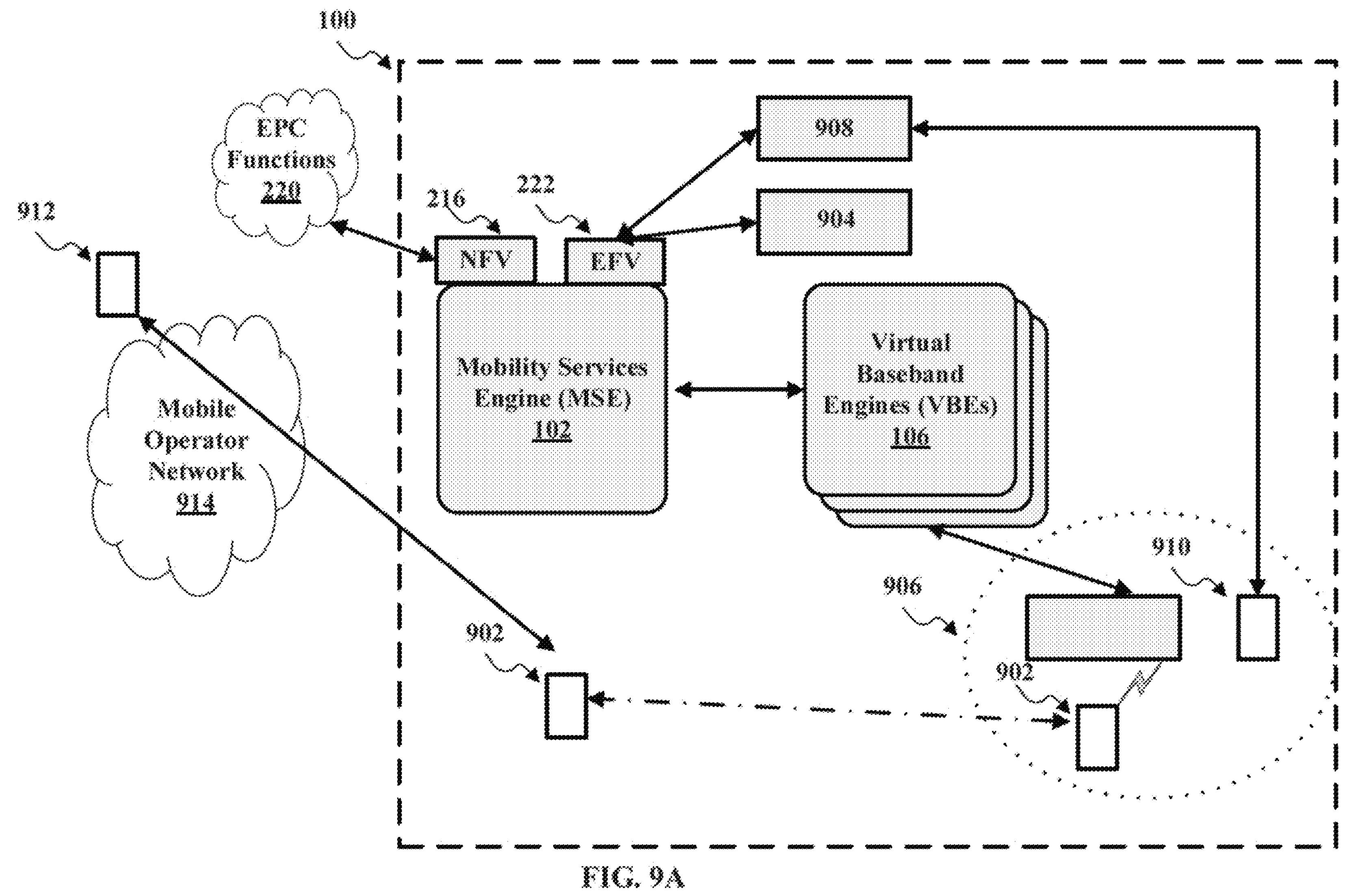
Figure 9B:
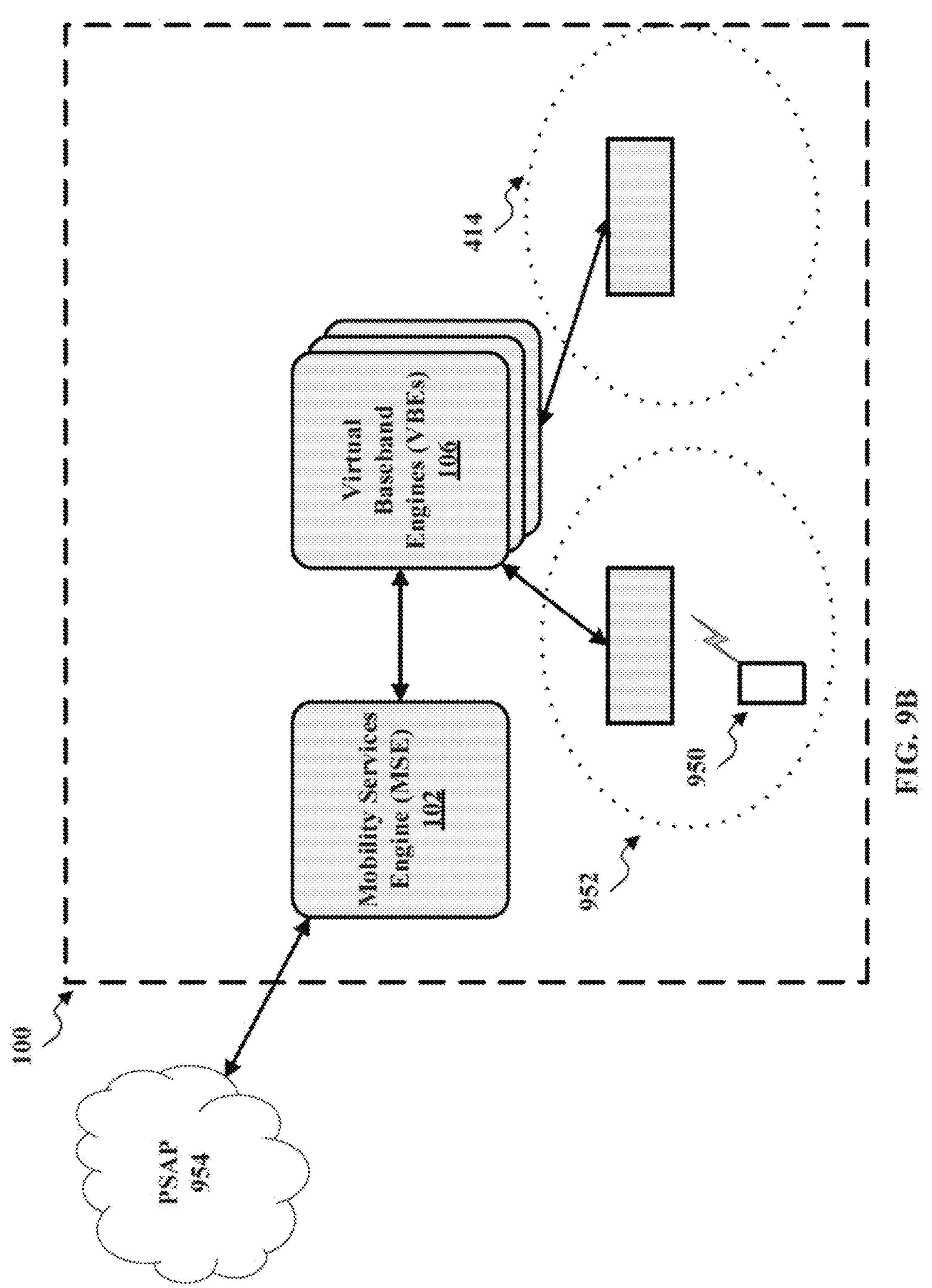

FIG. 8 and FIGS. 9A and 9B illustrate an example of a method of 800 for providing services to a location, according to various implementations. The illustrated stages of the method are examples and that any of the illustrated stages can be removed, additional stages can be added, and the order of the illustrated stages can be changed.

In 802, the MSE enables an interface for application services. For example, the MSE can configure the interface to be accessible by applications, for example, configure the interface to enable access to the protocols associated with the application. In 804, the MSE registers and authenticates an application with the interface. For example, the application utilizes an authentication exchange using an XML, JSON, or other interface to process the authentication exchange and possible utilizing certification key methods, to validate that the application is a valid application and should be allowed access to the interface for application services.

In 806, the MSE receives information associated with a UE, which may be a mobile phone user or other non-user devices that may be on this network such as IoT devices. The information associated with the UE can include any information that allows the MSE to cooperate with the application to deliver the services. For example, the information can include an identification of the UE, for example, a phone number, a SIM card identifier, a Media Access Control Address (MAC), etc., and state information for the UE, for example, location of the UE, call status of a UE, etc. The information can also include a change in the state information for the UE.

In 808, the MSE pushes, via the interface, the information to the application. The application can utilize the information to perform the services provided by the application. In 810, the MSE receives, via the interface, a request to perform an action from the application. For example, based on the information provided, the application can instruct the MSE to perform an action at the location associated with the services. In 812, the MSE performs the requested action. After 812, the method 300 can return to 806 and the MSE can await new information associated with the UE.

For example, as illustrated in FIG. 9A, the location 100 can be a hotel. The hotel may desire to provide several services to guests of the hotel. For example, the hotel may support automatic check-in and simultaneous room ringing for a UE 902. In automatic check-in, the location 100 can include a hotel property management application 904 that communicates with the MSE 102 via the EFV interface 222. When the UE 902 enters the hotel, the UE 902 can communicate with the MSE 102, and the MSE 102 can information associated with the UE 902, for example, identifying information, location etc. The MSE 102 can then forward the information tot the hotel property management application 904, via the EFV interface 222. In response, the hotel property management application 904 can perform actions, such as identify the user associated with the UE 902, check the user into a room 906 in the hotel, etc. The hotel property management application 904 can also request that the MSE 102 perform actions such as notify the UE 902 of check-in.

In this example, the location 100 may also include a telephone system 908. The telephone system 908 can support simultaneous ringing a phone 910 when the user is located in their room 906. In this case, the MSE 102 can, upon observing an inbound call towards a UE associated with a known room, and when the UE 902 is identified as being "in the room" 906, utilize the EFV interface 222, via a local telephone IP interface, to ring the telephone 910. The MSE 102 can also coordinate routing the incoming call to the telephone 910, if the user answers the telephone 910, systematically performing appropriate CODEC translation to match with the telephone system 908.

In another example, as illustrated in FIG. 9B, the location of a UE 950 can be employed by 911 applications to report the location, for example, a room 952, of the UE 950 making a 911 call, or otherwise employed by similar emergency applications. In this example, the MSE 102 can enable an interface for a public safety answering point (PSAP) system 954. When the UE 950 dial 911, the MSE 102 can push the location information of the UE 950 to the PSAP system 954. Where and when further enabled by emerging UE standards a 911 call by a user or other emergency state within a location may allow for the MSE and/or VBEs to force an emergency state of the UE, enabling all radios in the UE device, including cellular, Wi-Fi, and Bluetooth technologies, to optimize location intelligence to the benefit of users in an emergency state.

Figure 10:
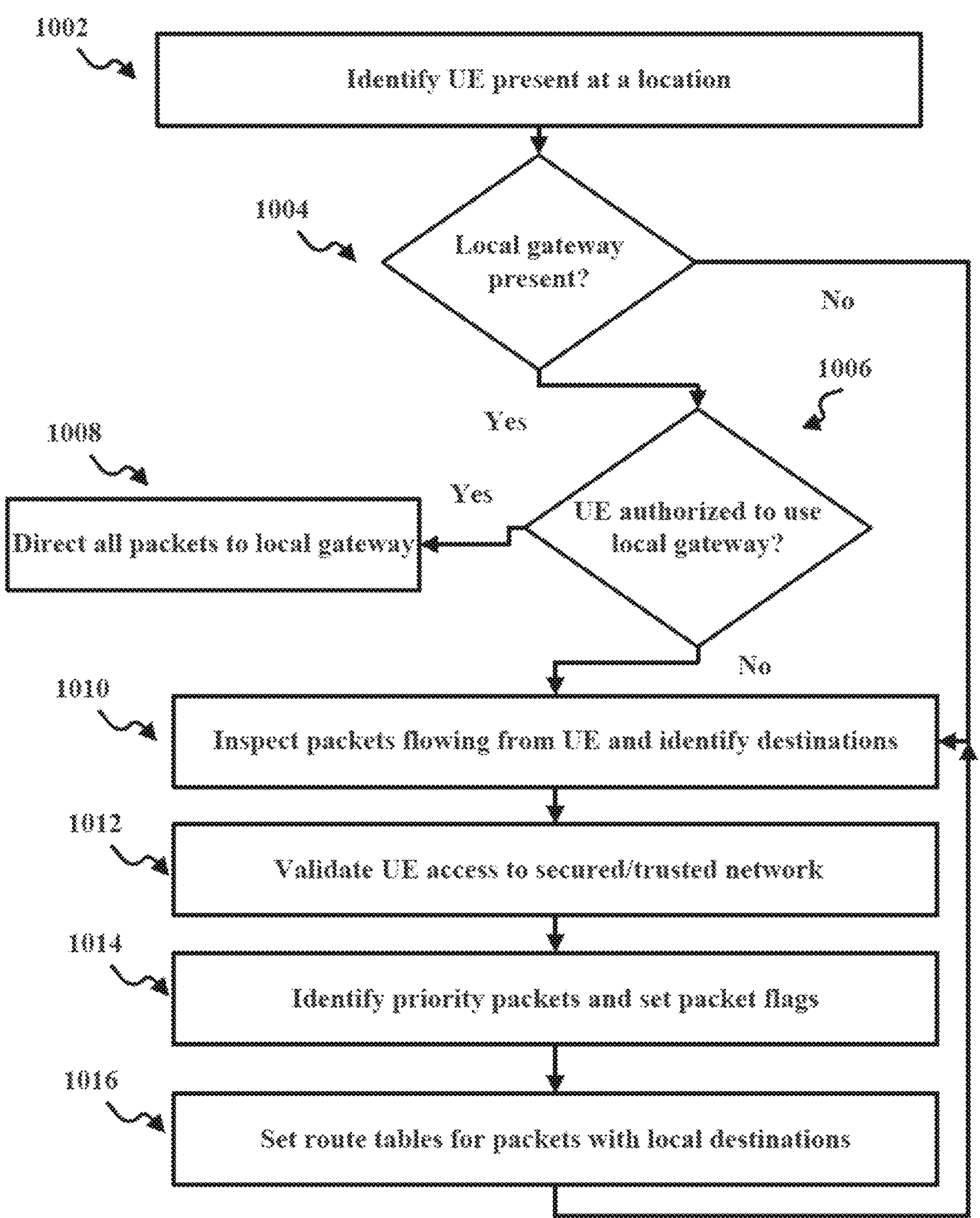
FIG. 10 and FIG. 11 illustrate an example of a method for routing network communications, according to various implementations.
Figure 11:
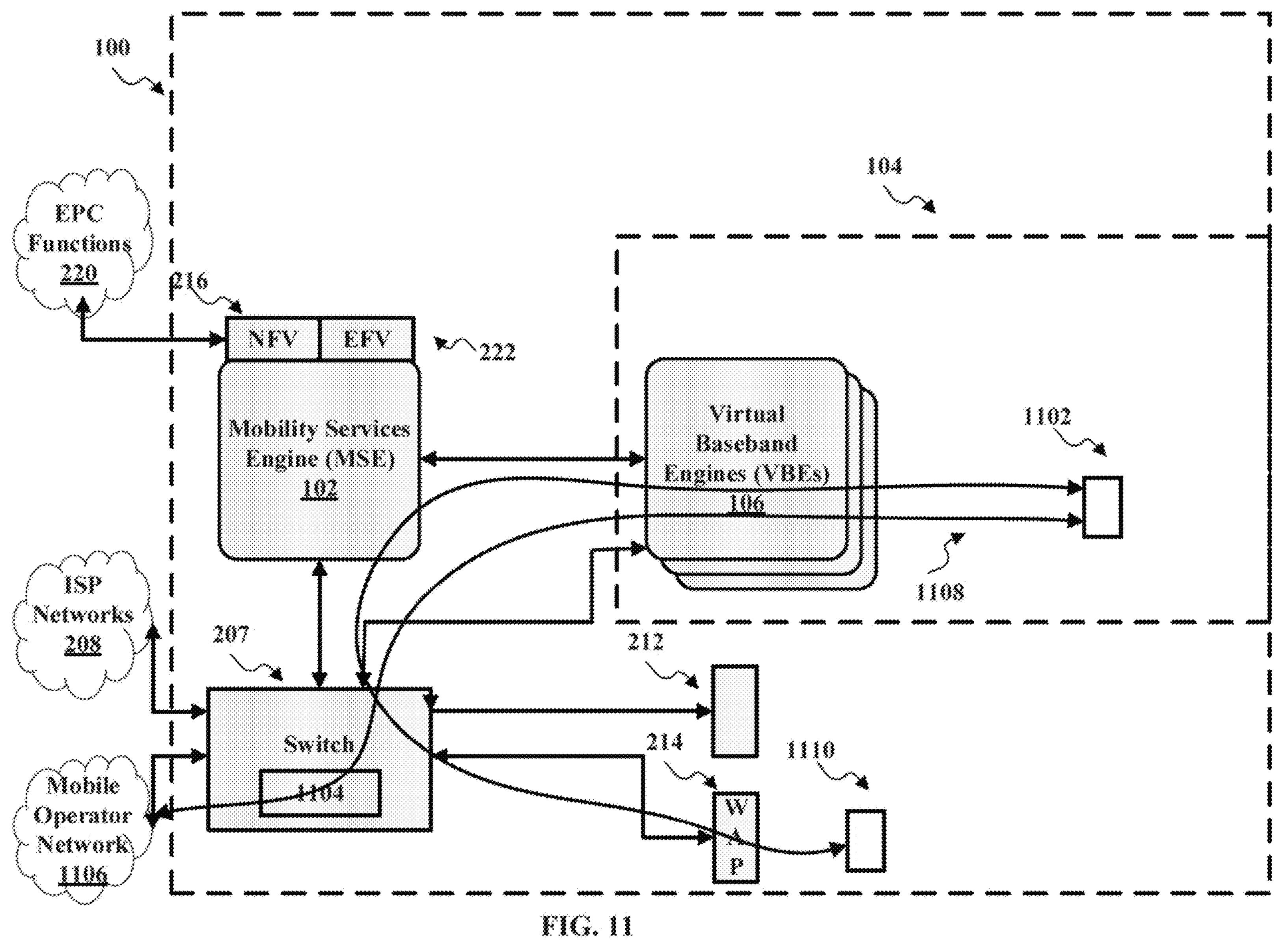

FIG. 10 and FIG. 11 illustrate an example of a method 1000 for routing network communications, according to various implementations. The illustrated stages of the method are examples and that any of the illustrated stages can be removed, additional stages can be added, and the order of the illustrated stages can be changed.

In 1002, the MSE identifies a UE present in a location. The MSE can identify the UE is present when the UE attempts to communicate with one of the networks coordinated by the MSE. For example, as illustrated in FIG. 11, a UE 1102 may enter the location 100 and register with the VBEs 106.

Once the UE is identified, in 1004, the MSE can determine whether a local gateway is present. A local gateway can be a system that provides a dedicated bearer channel to certain UEs. For example, a mobile operator network can offer the dedicated bearer channel as a service to subscribing UEs. As illustrated in FIG. 11, for example, a local gateway 1104 can be offered by a mobile operator network 1106. The local gateway 1104 can be implemented in the switch 207. The local gateway 1104 can be implemented in hardware, software, or combination thereof. The MSE 102 can push a request to the mobile operator network 1106 via the NFV interface 216 to determine if the local gateway 1104 is present. The MSE 102 can also examine the switch 207 or records to determine if the local gateway 1104 is present.

If a local gateway is present, in 1006, the MSE determines whether the UE is authorized to use the local gateway. The MSE can communicate with the mobile operator network associated with local gateway to determine if the UE is authorized to use the local gateway. For example, the MSE 102 can push a request to the mobile operator network 1106 via the NFV interface 216 to determine if the UE 1102 is authorized.

If the UE is authorized to use the local gateway, in 1008, the MSE directs all packets to the local gateway. For example, as illustrated in FIG. 11, the MSE 102 can establish a communication path 1108 to the local gateway.

If a local gateway is not present or the UE is not authorized to use the local gateway, in 1010, the MSE inspects packets flowing from the UE and identifies the destination of the packets. In some implementations, the packets may be destined for an internal network to the location. For example, as illustrated in FIG. 11, the UE 1102 can make a call to a second UE 1110 that is communicating via a WAP 214, for example, one a trusted or secure network. In 1012, the MSE can validate the UE access to the secured/trusted network. For example, the MSE 102 can request validation for internal or external policy managers to determine if the UE 1102 can access the secured/trusted network.

In 1014, the MSE identifies priority packets and sets packet flags for the priority packets. For example, the MSE 102 can determine that the packets are associated with a voice call. In response, the MSE 102 can set packet flags the packets to identify the packets as priority packets to receive, for example, special processing, higher quality of service, etc. In 1016, the MSE sets route tables for packets with local destination. The MSE can set the route tables in the switch 207. Once the MSE sets the route tables, the switch 207 can direct traffic to the UE 1110 over the WAP 214.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In implementations, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 12:
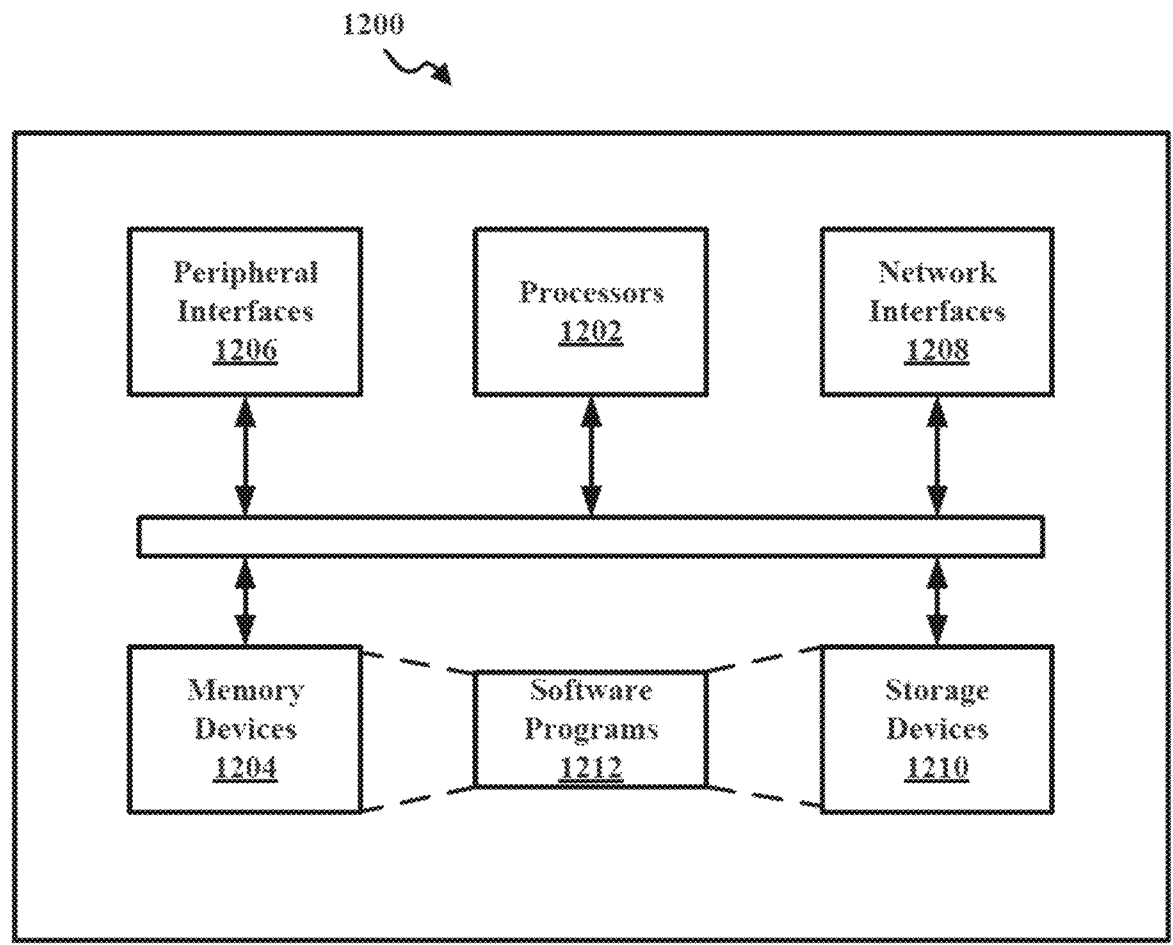
FIG. 12 illustrates an example of a hardware configuration for a computer device, according to various implementations.

For example, FIG. 12 illustrates an example of a hardware configuration for a computer device 1200 that can be used as a computer system or device, which can be used to perform one or more of the processes described above. While FIG. 12 illustrates various components contained in the computer device 1200, FIG. 12 illustrates one example of a computer device and additional components can be added and existing components can be removed.

The computer device 1200 can be any type of computer devices, such as desktops, laptops, servers, etc., or mobile devices, such as smart telephones, tablet computers, cellular telephones, personal digital assistants, etc. As illustrated in FIG. 12, the computer device 1200 can include one or more processors 1202 of varying core configurations and clock frequencies. The computer device 1200 can also include one or more memory devices 1204 that serve as a main memory during the operation of the computer device 1200. For example, during operation, a copy of the software that supports the methods and processes described above, for example, the MSE 102, can be stored in the one or more memory devices 1204. The computer device 1200 can also include one or more peripheral interfaces 1206, such as keyboards, mice, touchpads, computer screens, touchscreens, etc., for enabling human interaction with and manipulation of the computer device 1200.

The computer device 1200 can also include one or more network interfaces 1208 for communicating via one or more networks, such as Ethernet adapters, wireless transceivers, or serial network components, for communicating over wired or wireless media using protocols. The computer device 1200 can also include one or more storage device 1210 of varying physical dimensions and storage capacities, such as flash drives, hard drives, random access memory, etc., for storing data, such as images, files, and program instructions for execution by the one or more processors 1202.

Additionally, the computer device 1200 can include one or more software programs 1212 that enable the functionality described above. The one or more software programs 1212 can include instructions that cause the one or more processors 1202 to perform the processes and methods described herein. Copies of the one or more software programs 1212 can be stored in the one or more memory devices 1204 and/or on in the one or more storage devices 1210. Likewise, the data utilized by one or more software programs 1212 can be stored in the one or more memory devices 1204 and/or on in the one or more storage devices 1210.

In implementations, the computer device 1200 can communicate with other devices via one or more networks. The other devices can be any types of devices as described above. The one or more networks can be any type of network, such as a local area network, a wide-area network, a virtual private network, the Internet, an intranet, an extranet, a public switched telephone network, an infrared network, a wireless network, and any combination thereof. The one or more networks can support communications using any of a variety of commercially-available protocols, such as TCP/IP, UDP, OSI, FTP, UPnP, NFS, CIFS, AppleTalk, and the like. The one or more networks can be, for example, a local area network, a wide-area network, a virtual private network, the Internet, an intranet, an extranet, a public switched telephone network, an infrared network, a wireless network, and any combination thereof.

The computer device 1200 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1200 as described above need not be enclosed within a single enclosure or even located in close proximity to one another. Those skilled in the art will appreciate that the above-described componentry are examples only, as the computer device 1200 can include any type of hardware componentry, including any necessary accompanying firmware or software, for performing the disclosed implementations. The computer device 1200 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described implementations without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its implementations, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the implementations, and may also include other parts not describe in the embodiments.

Accordingly, the disclosure is not limited to the above-described implementations, but instead is defined by the appended claims in light of their full scope of equivalents.

What is claimed is:

1. A method for providing network services at a location, the method comprising:

responsive to receiving a call to a predefined emergency number from a user device via a mobility services engine or a virtual baseband engine, performing:

forcing, by the mobility services engine or the virtual baseband engine, an emergency state of the user device, the forcing of the emergency state comprising:

causing the user device to enable all radios in the user device, including any of cellular technology, Wi-Fi technology, and Bluetooth technology, to determine a location of the user device by use of remote radios and antennas at known locations in an RF distributions platform;

obtaining, by the mobility services engine, first information associated with the user device, wherein the first information comprises location information corresponding to the location of the user device; and pushing, by the mobility services engine, the first information to a public safety answering point.

2. The method of claim 1, further comprising:

enabling an interface for providing second information associated with the user device;

registering an application with the interface, wherein the application provides one or more services to the user device based at least partially on the second information;

receiving the second information associated with the user device, wherein the second information comprises one or more of identification information of the user device and state information of the user device; and pushing the second information to the application via the interface.

3. The method of claim 2, the method further comprising:

receiving, via the second interface, a request to perform an action based on the second information.

4. The method of claim 3, wherein the action comprises routing network communications from the user device to one or more of a local gateway at the location and a local area network at the location.

5. The method of claim 2, wherein the second information includes the location of the user device.

6. The method of claim 1, further comprising:

implementing, by at least one of the mobile services engine and the virtual baseband engine, a Closed Subscriber Group that limits which user devices are allowed to handover to a location based on policies set forth by a configuration.

7. The method of claim 6, further comprising:

applying, by the at least one of the mobile services engine and the virtual baseband engine, special data routing policies to individual ones of the user devices to enable users to access various networks and data resources of the location.

8. The method of claim 6, further comprising:

applying, by the at least one of the mobile services engine and the virtual baseband engine, special data routing policies to individual ones of the user devices to enable users to access various networks and data resources of the location.

9. A non-transitory computer readable medium storing instructions that cause one or more processors to perform a method comprising:

responsive to receiving a call to a predefined emergency number from a user device via a mobility services engine or a virtual baseband engine, performing:

forcing, by the mobility services engine or the virtual baseband engine, an emergency state of the user device, the forcing of the emergency state comprising:

causing the user device to enable all radios in the user device, including any of cellular technology, Wi-Fi technology, and Bluetooth technology, to determine a location of the user device by use of remote radios and antennas at known locations in an RF distributions platform;

obtaining, by the mobility services engine, first information associated with the user device, wherein the first information comprises location information corresponding to the location of the user device; and pushing, by the mobility services engine, the first information to a public safety answering point.

10. The non-transitory computer readable medium of claim 9, wherein the method further comprises:

enabling an interface for providing second information associated with the user device;

registering an application with the interface, wherein the application provides one or more services to the user device based at least partially on the second information;

receiving the second information associated with the user device, wherein the second information comprises one or more of identification information of the user device and state information of the user device; and pushing, via the interface, the second information to the application.

11. The non-transitory computer readable medium of claim 10, wherein the method further comprises:

receiving, via the interface, a request to perform an action based on the second information.

12. The non-transitory computer readable medium of claim 11, wherein the action comprises routing network communications from the user device to one or more of a local gateway at the location and a local area network at the location.

13. The non-transitory computer readable medium of claim 10, wherein the second information includes the location of the user device.

14. The non-transitory computer readable medium of claim 9, wherein the instructions further cause the one or more processors to perform:

implementing, by at least one of the mobile services engine and the virtual baseband engine, a Closed Subscriber Group that limits which user devices are allowed to handover to a location based on policies set forth by a configuration.

15. The non-transitory computer readable medium of claim 14, wherein the instructions further cause the one or more processors to perform:

applying, by the at least one of the mobile services engine and the virtual baseband engine, special data routing policies to individual ones of the user devices to enable users to access various networks and data resources of the location.

16. A method for establishing a mobile call over a wireless network, the method comprising:

receiving, by a mobile services engine, a request to establish a communication path from a user device to a mobile operator network through a wireless access point;

determining, by the mobile services engine, whether the user device is authorized to access the wireless access point, the determining comprising:

determining, by the mobile services engine, whether a local policy manager or an external policy manager determines access to the wireless access point, and pushing, by the mobile services engine via an interface, a request to authorize the user device to the local policy manager or the external policy manager;

sending, by the mobile services engine in response to the user device being authorized to access the wireless access point, a request to authenticate the user device to the mobile operator network; and establishing, by the mobile services engine in response to the user device being authorized, the communication path from the user device to the mobile operator network through the wireless access point.

17. The method of claim 16, wherein the sending the request to authenticate the user device comprises:

pushing the request to the mobile operator network via an interface.

18. The method of claim 16, wherein the sending the request to authenticate the mobile device includes sending the request to authenticate the mobile device to the local policy manager or the external policy manager via an enterprise function virtualization interface.

19. The method of claim 16, further comprising:

implementing, by at least one of the mobile services engine and the virtual baseband engine, a Closed Subscriber Group that limits which user devices are allowed to handover to a location based on policies set forth by a configuration.

* * * * *